US011060771B2

(12) United States Patent
Masahiro et al.

(10) Patent No.: US 11,060,771 B2
(45) Date of Patent: Jul. 13, 2021

(54) AIR CONDITIONER WITH A REFRIGERANT RATIO ADJUSTOR

(71) Applicant: Samsung Electronics Co., Ltd, Suwon-si (KR)

(72) Inventors: Aono Masahiro, Kanagawa (JP);
Takeichi Hisashi, Kanagawa (JP);
Isikawa Hideki, Kanagawa (JP);
Kaneko Takashi, Kanagawa (JP);
Ogasawara Tetsuya, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 15/793,869

(22) Filed: Oct. 25, 2017

(65) Prior Publication Data

US 2018/0112899 A1    Apr. 26, 2018

(30) Foreign Application Priority Data

Oct. 25, 2016  (JP) .............................. JP2016-209103
Oct. 25, 2016  (JP) .............................. JP2016-209104
(Continued)

(51) Int. Cl.
*F25B 41/31*      (2021.01)
*G05D 11/02*     (2006.01)
(Continued)

(52) U.S. Cl.
CPC .............. *F25B 41/31* (2021.01); *F25B 40/00* (2013.01); *F25B 41/40* (2021.01); *F25B 49/02* (2013.01);
(Continued)

(58) Field of Classification Search
CPC .. F25B 43/00; F25B 43/006; F25B 2313/023; F25B 2313/0233; F25B 2400/0403;
(Continued)

(56) References Cited

U.S. PATENT DOCUMENTS 2,828,614 A    4/1958 Smith
5,036,680 A *  8/1991 Fujiwara ................. F25B 40/02
                                                                62/224
(Continued)

FOREIGN PATENT DOCUMENTS

EP    2629030 A1    8/2013
EP    3026370 A1    1/2016
(Continued)

OTHER PUBLICATIONS

ISA/KR, "International Search Report," International Application No. PCT/KR2017/011804, dated Feb. 7, 2018, 3 pages.
(Continued)

*Primary Examiner* — Edward F Landrum
*Assistant Examiner* — Daniel C Comings

(57) ABSTRACT

According to an embodiment of the present disclosure, an air conditioner includes an outdoor heat exchanger disposed in an outdoor unit and an indoor heat exchanger disposed in an indoor unit. The air conditioner also includes a refrigerant pipe configured to connect the outdoor heat exchanger and the indoor heat exchanger. The air conditioner also includes and a refrigerant ratio adjusting device configured adjust a ratio between a liquid refrigerant and a gaseous refrigerant passing through the refrigerant pipe.

9 Claims, 19 Drawing Sheets

(30) Foreign Application Priority Data

| Oct. 28, 2016 | (JP) | JP2016-211649 |
|---|---|---|
| Aug. 7, 2017 | (JP) | JP2017-152153 |
| Sep. 29, 2017 | (KR) | 10-2017-0127725 |

(51) Int. Cl.
  *F25B 41/38* (2021.01)
  *F25B 49/02* (2006.01)
  *F25B 40/00* (2006.01)
  *F25B 41/40* (2021.01)
  *F25B 41/39* (2021.01)
  *F25B 41/385* (2021.01)

(52) U.S. Cl.
  CPC ............ *G05D 11/02* (2013.01); *F25B 41/385*
    (2021.01); *F25B 41/39* (2021.01); *F25B*
    *2313/0233* (2013.01); *F25B 2313/0311*
    (2013.01); *F25B 2313/0314* (2013.01); *F25B*
    *2313/0315* (2013.01); *F25B 2400/0403*
    (2013.01); *F25B 2400/13* (2013.01); *F25B*
    *2500/19* (2013.01); *F25B 2600/2513*
    (2013.01); *F25B 2700/1931* (2013.01); *F25B*
    *2700/1933* (2013.01); *F25B 2700/21*
    (2013.01); *F25B 2700/2106* (2013.01)

(58) Field of Classification Search
  CPC .......... F25B 2400/16; F25B 2600/2511; F25B
    2600/13; F25B 2313/029; F25B
    2313/0291; F25B 41/31; F25B
    2600/2513; F25B 2700/21; G05D 11/02
  See application file for complete search history.

(56) References Cited

U.S. PATENT DOCUMENTS

| 6,381,974 | B1 * | 5/2002 | Hwang | F25B 13/00 165/286 |
|---|---|---|---|---|
| 6,425,262 | B1 * | 7/2002 | Pomme | B60H 1/3205 62/509 |
| 7,350,367 | B2 * | 4/2008 | Matsiev | G01N 9/002 62/129 |
| 8,033,123 | B2 * | 10/2011 | Kasahara | F25B 49/005 62/127 |
| 2007/0028633 | A1 * | 2/2007 | Suzuki | B60H 1/3211 62/190 |
| 2009/0000321 | A1 * | 1/2009 | Hall | F25B 47/022 62/227 |
| 2009/0071177 | A1 * | 3/2009 | Unezaki | F25B 13/00 62/196.1 |
| 2011/0107780 | A1 * | 5/2011 | Yamaguchi | F25B 49/005 62/149 |
| 2014/0109605 | A1 * | 4/2014 | Qu | F25B 49/02 62/118 |
| 2015/0362238 | A1 * | 12/2015 | Tanaka | F25B 13/00 62/115 |
| 2016/0280041 | A1 | 9/2016 | Suzuki et al. | |
| 2018/0023835 | A1 * | 1/2018 | Ooura | F24F 11/30 165/288 |

FOREIGN PATENT DOCUMENTS

| JP | 2893844 | B2 | 5/1999 |
|---|---|---|---|
| JP | 2001-147057 | A | 5/2001 |
| JP | 2004162962 | A | 6/2004 |
| JP | 4191847 | B2 | 12/2008 |
| KR | 10-2013-0096962 | | 9/2013 |
| WO | 2016036176 | A1 | 3/2016 |

OTHER PUBLICATIONS

European Patent Office, "Supplementary Partial European Search Report," Application No. EP 17864718.6, dated Sep. 30, 2019, 15 pages.

Supplementary European Search Report dated Jan. 14, 2020 in connection with European Patent Application No. 17 86 4718, 11 pages.

\* cited by examiner

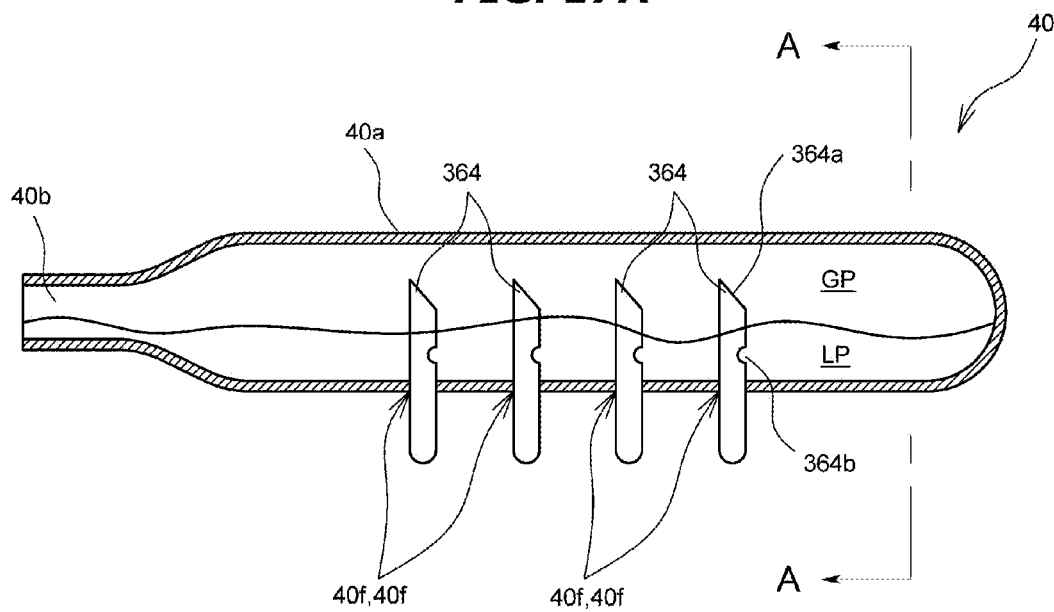

AIR CONDITIONER WITH A REFRIGERANT RATIO ADJUSTOR

CROSS-REFERENCE TO RELATED APPLICATION

The present application is related to and claims the benefit of Japanese Patent Application No. 2016-209103 filed on Oct. 25, 2016; Japanese Patent Application No. 2016-209104 filed on Oct. 25, 2016; Japanese Patent Application No. 2016-211649 filed on Oct. 28, 2016; Japanese Patent Application No. 2017-152153 filed on Aug. 7, 2017 and Korean Patent Application No. 10-2017-0127725 filed on Sep. 29, 2017, the contents of which are incorporated herein by reference in their entireties.

TECHNICAL FIELD

The present disclosure relates to an air conditioner including an indoor unit and an outdoor unit.

BACKGROUND

An air conditioner is an apparatus that includes components of a refrigeration cycle such as a compressor, a condenser, an evaporator, and an expansion valve and cools or heats an indoor space by supplying cold air or hot air generated through the refrigeration cycle.

The air conditioner includes an outdoor unit disposed in an outdoor space and an indoor unit disposed in an indoor space. The components of the refrigeration cycle are distributed between the outdoor unit and the indoor unit and are connected to each other via refrigerant pipes through which a refrigerant circulates.

Among the air conditioners, as disclosed in Japanese Patent Publication No. 2001-174088, there is an air conditioner using a non-azeotropic mixture refrigerant as a refrigerant used in a refrigeration cycle and including a valve for storing a remaining refrigerant in a refrigerant pipe between a condenser and an evaporator during operation or when the operation stops.

Also, among the air conditioners, as disclosed in Japanese Patent Publication No. 2015-68596, there is an air conditioner in which a central processing unit (CPU) checks a suction pressure and suction temperature, calculates a saturation temperature corresponding to an evaporation pressure using the checked suction pressure, calculates a degree of suction superheat using the checked suction temperature and the calculated saturation temperature corresponding to the evaporation pressure, reads out a current opening degree of an outdoor expansion valve, determines a control state of an outdoor fan by using the acquired suction pressure or opening degree of the outdoor expansion valve and the calculated degree of suction superheat and referring to an outdoor fan control table, and performs control of the outdoor fan in accordance with a control method determined with reference to an outdoor fan revolutions per minute (RPM) table.

SUMMARY

To address the above-discussed deficiencies, it is a primary object to provide an air conditioner capable of maintaining performance while reducing an amount of refrigerant.

According to an aspect of the present disclosure, an air conditioner includes an outdoor heat exchanger disposed in an outdoor unit, an indoor heat exchanger disposed in an indoor unit, a refrigerant pipe configured to connect the outdoor heat exchanger and the indoor heat exchanger, and a refrigerant ratio adjusting device configured to adjust a ratio between a liquid refrigerant and a gaseous refrigerant passing through the refrigerant pipe.

The refrigerant ratio adjusting device may include a plurality of refrigerant ratio adjusting devices sequentially disposed in the refrigerant pipe and configured to decompress a refrigerant flowing from any one of the outdoor heat exchanger and the indoor heat exchanger to the other in stages.

Among the plurality of refrigerant ratio adjusting devices, any one of the refrigerant ratio adjusting devices located upstream in a direction in which the refrigerant flows may adjust a refrigerant decompression amount in accordance with a condensation pressure in one of the outdoor heat exchanger and the indoor heat exchanger in which condensation of the refrigerant occurs.

The air conditioner may further include a bypass pipe configured to allow the refrigerant to bypass the outdoor heat exchanger during a cooling operation and an opening-closing valve disposed in the bypass pipe.

The air conditioner may further include a compressor disposed upstream of the outdoor heat exchanger and configured to compress the refrigerant during the cooling operation and a controller configured to control the opening-closing valve in response to a gas pressure of the indoor heat exchanger.

The air conditioner may further include a bypass pipe configured to allow the refrigerant to bypass the indoor heat exchanger during a heating operation and an opening-closing valve configured to open or close the bypass pipe.

According to an aspect of the present disclosure, an air conditioner includes a main refrigerant circuit in which a compressor, an indoor heat exchanger, a first decompression valve, a second decompression valve, a third decompression valve, and an outdoor heat exchanger are connected in that order, an injection circuit branched from between the first decompression valve and the second decompression valve of the main refrigerant circuit and connected to the compressor, and a bypass pipe configured to allow the third decompression valve to be connected in parallel to the second decompression valve.

The bypass pipe may have one end connected to between the outdoor heat exchanger and the second decompression valve and the other end connected more adjacent to the indoor heat exchanger than a branch point between the main refrigerant circuit and the injection circuit.

The air conditioner may further include a sensor configured to measure an outside air temperature or an outside air temperature indication value and a controller configured to control the first decompression valve, the second decompression valve, and the third decompression valve in accordance with the outside air temperature.

The main refrigerant circuit may further include a distributor configured to distribute the refrigerant to a plurality of heat transfer pipes included in the outdoor heat exchanger, and the distributor may include an inlet pipe extending toward the second decompression valve and a plurality of outlet pipes connected to the plurality of heat transfer pipes.

The distributor may be installed such that the inlet pipe faces downward and the plurality of outlet pipes face upward, and the controller may control a flow speed of the refrigerant flowing through each of the outlet pipes of the distributor to be equal to or higher than a threshold refrigerant flow speed U represented by Mathematical Relation 1 below.

$$U=\{g \cdot dx \cdot (\rho_{liq}-\rho_g)/\rho_g\}^{0.5}$$ [Mathematical Relation 1]

g indicates gravitational acceleration (m/sec²), dx indicates an inner diameter (m) of the outlet pipe of the distributor in a state in which a degree of dryness at the inlet pipe side of the distributor is 0.12 or higher, $\rho_{liq}$ indicates a liquid density (kg/m³) of a refrigerant, and $\rho_g$ indicates a gas density (kg/m³) of the refrigerant.

According to an aspect of the present disclosure, an air conditioner includes a compressor, an outdoor heat exchanger, a refrigerant circuit having a plurality of expansion valves connected in parallel to each other and a plurality of indoor heat exchangers respectively connected in series to the plurality of expansion valves, a gas-liquid separator installed between the plurality of expansion valves and the outdoor heat exchanger, and a distribution flow path configured to distribute at least a portion of a gaseous refrigerant and the entire liquid refrigerant in the gas-liquid separator to the plurality of expansion valves.

The air conditioner may further include a bypass flow path configured to bypass a portion of the gaseous refrigerant in the gas-liquid separator between the compressor and the plurality of indoor heat exchangers.

The distribution flow path may include a plurality of first branch refrigerant pipes having one end connected to pass through a gas-phase space and a liquid-phase space of the gas-liquid separator and the other end branched into a number of sections corresponding to the number of the plurality of expansion valves, wherein the other end of each of the plurality of first branch refrigerant pipes is connected to the plurality of expansion valves.

The distribution flow path may include a plurality of first branch refrigerant pipes having one end connected to cross a gas-phase space and a liquid-phase space of the gas-liquid separator and the other end branched into a number of sections corresponding to the number of the plurality of expansion valves, and a plurality of second branch refrigerant pipes having one end connected to the gas-phase space of the gas-liquid separator and the other end branched into a number of sections corresponding to the number of the plurality of expansion valves, wherein the other ends of the first branch refrigerant pipes and the second branch refrigerant pipes corresponding to each other meet and are connected to a corresponding expansion valve of the plurality of expansion valves.

The distribution flow path may include a plurality of second branch refrigerant pipes having one end connected to a gas-phase space of the gas-liquid separator and the other end branched into a number of sections corresponding to the number of the plurality of expansion valves, and a plurality of third branch refrigerant pipes having one end connected to a liquid-phase space in the gas-liquid separator and the other end branched into a number of sections corresponding to the number of the plurality of expansion valves, wherein the other ends of the second branch refrigerant pipes and the third branch refrigerant pipes corresponding to each other meet and are connected to a corresponding expansion valve of the plurality of expansion valves.

The distribution flow path may include a plurality of fourth branch refrigerant pipes corresponding to the number of the plurality of expansion valves, wherein each of the fourth branch refrigerant pipes has one end separately connected to a gas-phase space of the gas-liquid separator and the other end connected to a corresponding expansion valve of the plurality of expansion valves.

The one end of each of the fourth branch refrigerant pipes may be installed to pass through a liquid-phase space and reach the gas-phase space in the gas-liquid separator, and each of the fourth branch refrigerant pipes may include a first intake provided at the one end side and through which the gaseous refrigerant in the gas-liquid separator is drawn in and a second intake through which the liquid refrigerant in the gas-liquid separator is drawn in.

At least one of the first intake and the second intake may be open in a direction in which the refrigerant passing through the gas-liquid separator flows.

A ratio between an open area of the first intake and an open area of the second intake may be equal to a ratio between the gaseous refrigerant and the liquid refrigerant.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 17A and 17B illustrate cross-sectional views of a gas-liquid separator applied to the air conditioner according to the tenth embodiment of the present disclosure.

DETAILED DESCRIPTION

Figure 1:
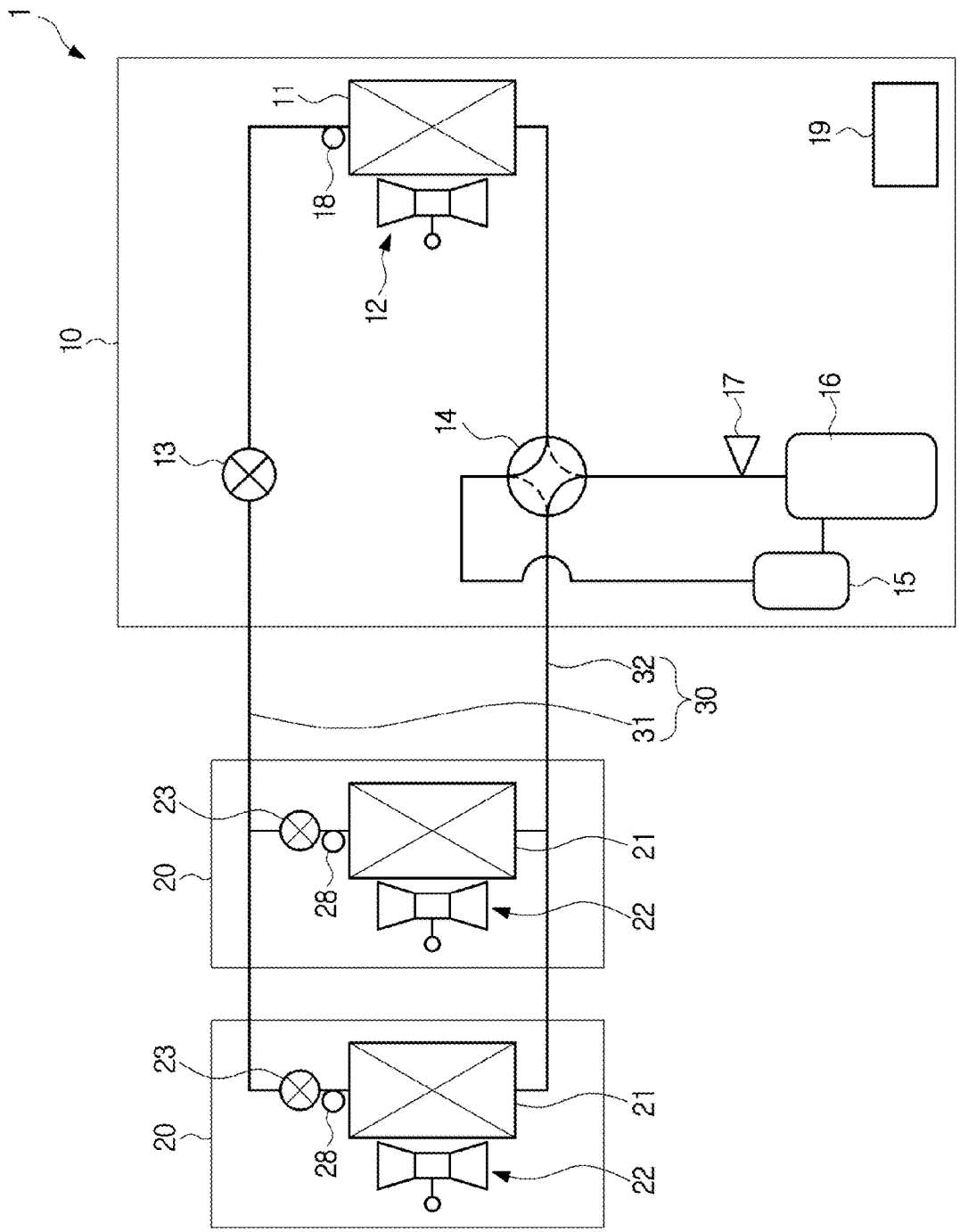
FIG. 1 illustrates a schematic block diagram of an air conditioner according to a first embodiment of the present disclosure.
Figure 2:
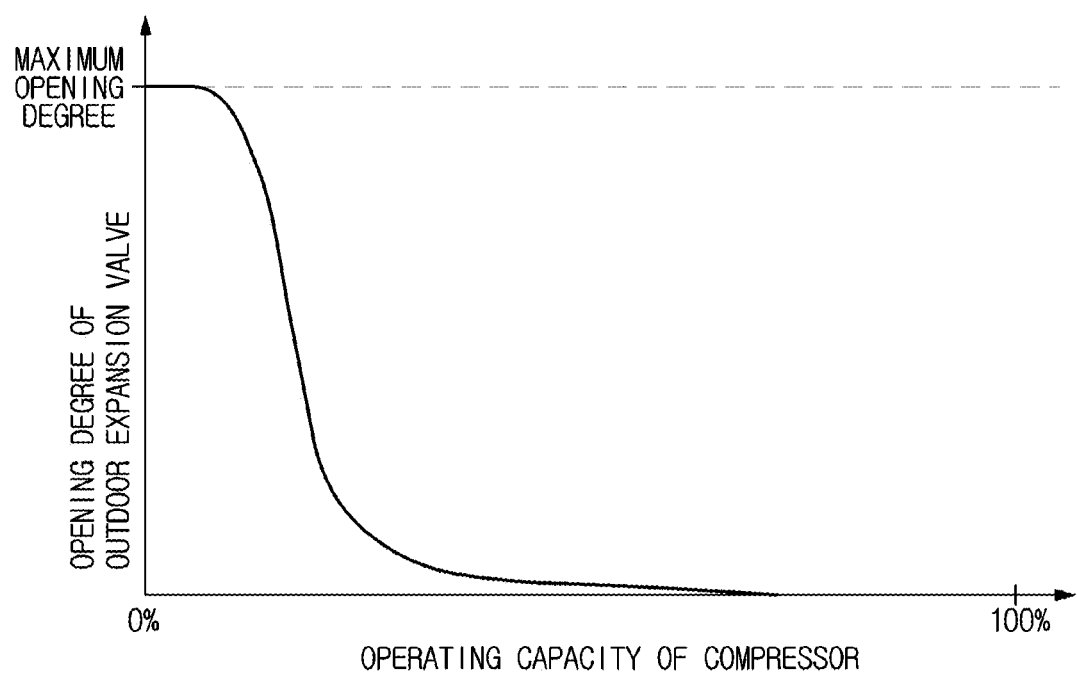
FIG. 2 illustrates a view of an approximate curve of a function for determining an adjustment of an opening degree.

FIGS. 1 through 17B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments described herein and configurations illustrated in the drawings are merely exemplary embodiments of the present disclosure, and various modifications which may replace the embodiments and the drawings herein may be present at the time of filing this application.

Like reference numerals or symbols presented in the drawings of the application indicate parts or elements that perform substantially the same functions.

Terms used herein are for describing the embodiments and are not intended to limit the present disclosure. A singular expression includes a plural expression unless context clearly indicates otherwise. In the application, terms such as "include" or "have" should be understood as designating that features, numbers, steps, operations, elements, parts, or combinations thereof exist and not as precluding the existence of or the possibility of adding one or more other features, numbers, steps, operations, elements, parts, or combinations thereof in advance.

Terms including ordinals such as "first" and "second" used herein may be used to describe various elements, but the elements are not limited by the terms. The terms are only used for the purpose of distinguishing one element from another element. For example, a first element may be referred to as a second element while not departing from the scope of the present disclosure, and likewise, a second element may also be referred to as a first element. The term "and/or" includes a combination of a plurality of related described items or any one item among the plurality of related described items.

Nowadays, including the EU F-gas regulation, various countries are calling for a reduction in an amount of refrigerant used in an air conditioner as one of measures for environmental preservation.

The present disclosure is to deal with such a demand. According to the present disclosure, an amount of refrigerant in an outdoor unit and an indoor unit is supplemented by controlling a state of a refrigerant passing through a liquid refrigerant pipe while an amount of refrigerant used in an air conditioner is reduced, thereby preventing deterioration of performance or failure of operation due to refrigerant shortage.

The air conditioner includes an outdoor unit and an indoor unit in which components of a refrigeration cycle are distributed, and the components of the refrigeration cycle are connected to each other via the liquid refrigerant pipe and a gaseous refrigerant pipe and form a closed circuit.

In such an air conditioner, when a density of a refrigerant in the liquid refrigerant pipe increases, an amount of refrigerant in the remaining components decreases. Conversely, when the density of the refrigerant in the liquid refrigerant pipe decreases, the amount of refrigerant in the remaining components increases.

Consequently, the amount of refrigerant in the remaining components may be controlled by controlling the density of the refrigerant in the liquid refrigerant pipe.

First Embodiment

An air conditioner according to a first embodiment of the present disclosure changes a liquid refrigerant passing through a liquid refrigerant pipe to a two-phase refrigerant, in which a liquid phase refrigerant and a gas phase refrigerant are mixed, by decompressing the liquid refrigerant using an expansion valve and decompresses the two-phase refrigerant by the expansion valve again, thereby increasing a proportion of gas and decreasing a density of the refrigerant. Here, the expansion valve serves as a refrigerant ratio adjusting device that expands the liquid refrigerant passing through the liquid refrigerant pipe and generates a gaseous refrigerant to adjust a ratio between the liquid refrigerant and the gaseous refrigerant.

FIG. 1 illustrates a schematic block diagram of an air conditioner 1 according to a first embodiment and illustrates a case in which the air conditioner 1 performs a heating operation.

The air conditioner 1 includes an outdoor unit 10 installed in an outdoor space such as a rooftop or a balcony of a building, two indoor units 20 installed in a space inside the building, and refrigerant pipes configured to connect the outdoor unit 10 and the indoor units 20 to allow a refrigerant to circulate through the outdoor unit 10 and the indoor units 20.

Although the air conditioner includes the two indoor units 20 connected to the single outdoor unit 10 with reference to FIG. 1, the air conditioner may also include a single or three or more indoor units 20.

The outdoor unit 10 includes an outdoor heat exchanger 11 configured to exchange heat with outdoor air, an outdoor blower 12 configured to allow the outdoor air to exchange heat by passing through the outdoor heat exchanger 11, and an outdoor expansion valve 13 configured to decompress and expand a high-temperature, high-pressure refrigerant.

The outdoor unit 10 also includes a four-way valve 14 configured to switch a flow path and allow the refrigerant to be transferred to any one of the outdoor heat exchanger 11 and indoor heat exchangers 21, an accumulator 15 configured to separate a liquid refrigerant to prevent introduction of the liquid refrigerant into a compressor 16, and the compressor 16 configured to compress the refrigerant.

The four-way valve 14 is connected to the outdoor heat exchanger 11, the accumulator 15, and the compressor 16 via a refrigerant pipe. The outdoor heat exchanger 11 and the outdoor expansion valve 13 are connected via a refrigerant pipe, and the accumulator 15 and the compressor 16 are connected via a refrigerant pipe.

The outdoor unit 10 includes a pressure sensor 17 configured to sense a pressure of the refrigerant discharged from the compressor 16 and a temperature sensor 18 configured to sense a temperature of an inlet of the outdoor heat exchanger 11.

The outdoor unit 10 also includes a controller 19 configured to control operations of the outdoor blower 12, the outdoor expansion valve 13, the compressor 16, and the four-way valve 14.

Each of the indoor units 20 includes the indoor heat exchanger 21 configured to exchange heat with indoor air, an indoor blower 22 configured to allow the indoor air to exchange heat by passing through the indoor heat exchanger 21, and an indoor expansion valve 23 configured to decompress and expand a condensed liquid refrigerant.

Each of the indoor units 20 includes a temperature sensor 28 configured to sense a temperature of an outlet of the indoor heat exchanger 21.

Refrigerant pipes 30 include a liquid refrigerant pipe 31 through which a liquid refrigerant passes and a gaseous refrigerant pipe 32 through which a gaseous refrigerant passes.

The liquid refrigerant pipe 31 connects the indoor expansion valve 23 of each of the indoor units 20 and the outdoor expansion valve 13 of the outdoor unit 10. The gaseous refrigerant pipe 32 connects the four-way valve 14 and the indoor heat exchanger 21 of each of the indoor units 20.

Although the indoor expansion valve 23 is included in each of the two indoor units 20 with reference to FIG. 1, a single indoor expansion valve may also be separately installed for a plurality of indoor units 20.

In this way, in the first embodiment, two or more expansion valves, which are refrigerant ratio adjusting devices, are installed between the outdoor heat exchanger 11 and the indoor heat exchangers 21, and decompression is performed in multiple stages by the expansion valves, thereby changing a liquid refrigerant passing through the liquid refrigerant pipe 31 to a two-phase refrigerant in which a gas and a liquid are mixed. Although the expansion valves are used as the refrigerant ratio adjusting devices above, embodiments are not limited thereto. For example, a capillary tube may also be used as the refrigerant ratio adjusting device.

The controller 19 estimates a density of the refrigerant from a condensation pressure and an evaporation pressure of the refrigerant in the outdoor heat exchanger 11 and the indoor heat exchangers 21 and controls the density. Because such control may be performed using the pressure sensor 17 and the temperature sensors 18 and 28, which are already applied to the air conditioner 1, an additional sensor is not required to be installed.

First, control during a cooling operation will be described.

During the cooling operation, an evaporation pressure of a refrigerant in the indoor heat exchangers 21 is controlled by the indoor expansion valves 23 so that a degree of superheat of the indoor heat exchangers 21 reaches a target degree of superheat.

A condensation pressure of a refrigerant in the outdoor heat exchanger 11 is controlled by the outdoor blower 12. Here, when an opening degree of the outdoor expansion valve 13 is decreased, the refrigerant gathers in the outdoor heat exchanger 11 side, and the condensation pressure in the outdoor heat exchanger 11 rises. Consequently, the controller 19 controls the outdoor expansion valve 13 to decrease the opening degree of the outdoor expansion valve 13 when the condensation pressure is lower than a target condensation pressure and to increase the opening degree of the outdoor expansion valve 13 when the condensation pressure is higher than the target condensation pressure.

Also, in the first embodiment, the air conditioner 1 may maintain efficiency by allowing the two-phase refrigerant to pass through the liquid refrigerant pipe 31 when operating in a normal load and may improve efficiency by allowing the liquid refrigerant to pass through the liquid refrigerant pipe 31 when operating in a lower load than the normal load.

That is, when loads in the indoor units 20 are low, efficiency is improved when the condensation pressure is lowered by decreasing an amount of refrigerant in the outdoor heat exchanger 11. Consequently, the opening degree of the outdoor expansion valve 13 is adjusted so that the opening degree of the outdoor expansion valve 13 increases as an operating capacity of the compressor 16 decreases. For example, adjustment of the opening degree may be determined by the function "Degree-of-opening correction=F(operating capacity of compressor)" represented by an approximate curve in FIG. 2.

Next, control during a heating operation will be described.

During the heating operation, an evaporation pressure of the refrigerant in the outdoor heat exchanger 11 is controlled by the outdoor blower 12 and the outdoor expansion valve 13 so that a degree of superheat of the outdoor heat exchanger 11 reaches a target degree of superheat.

A condensation pressure of the refrigerant in the indoor heat exchangers 21 is determined in accordance with a load in the indoor units 20.

When an opening degree of the indoor expansion valves 23 is decreased, a refrigerant is stored in the indoor heat exchangers 21, and a condensation pressure of the refrigerant rises. Consequently, the controller 19 controls the indoor expansion valves 23 to decrease the opening degree of the indoor expansion valves 23 when the condensation pressure is lower than a target condensation pressure and to increase the opening degree of the indoor expansion valves 23 when the condensation pressure is higher than the target condensation pressure.

In the first embodiment, when the cooling operation is performed under a condition in which large pressure loss may occur, such as a case in which the refrigerant pipes 30 between the outdoor unit 10 and the indoor units 20 are formed to be elongated, the evaporation pressure of the refrigerant in the indoor heat exchangers 21 may be deteriorated, and deterioration of performance may occur.

Hereinafter, a second embodiment, which is a first modified example for reducing occurrence of deterioration of performance of the air conditioner disclosed in the first embodiment above, will be described.

Second Embodiment

An air conditioner according to the second embodiment of the present disclosure allows a high-pressure gas before passing through the outdoor heat exchanger 11 to be bypassed to a downstream side of the outdoor heat exchanger 11 during the cooling operation.

Consequently, by making a high-pressure gaseous refrigerant to be mixed with the refrigerant passing through the liquid refrigerant pipe 31, a decompression amount required for the liquid refrigerant to become a two-phase refrigerant may be decreased.

Figure 3:
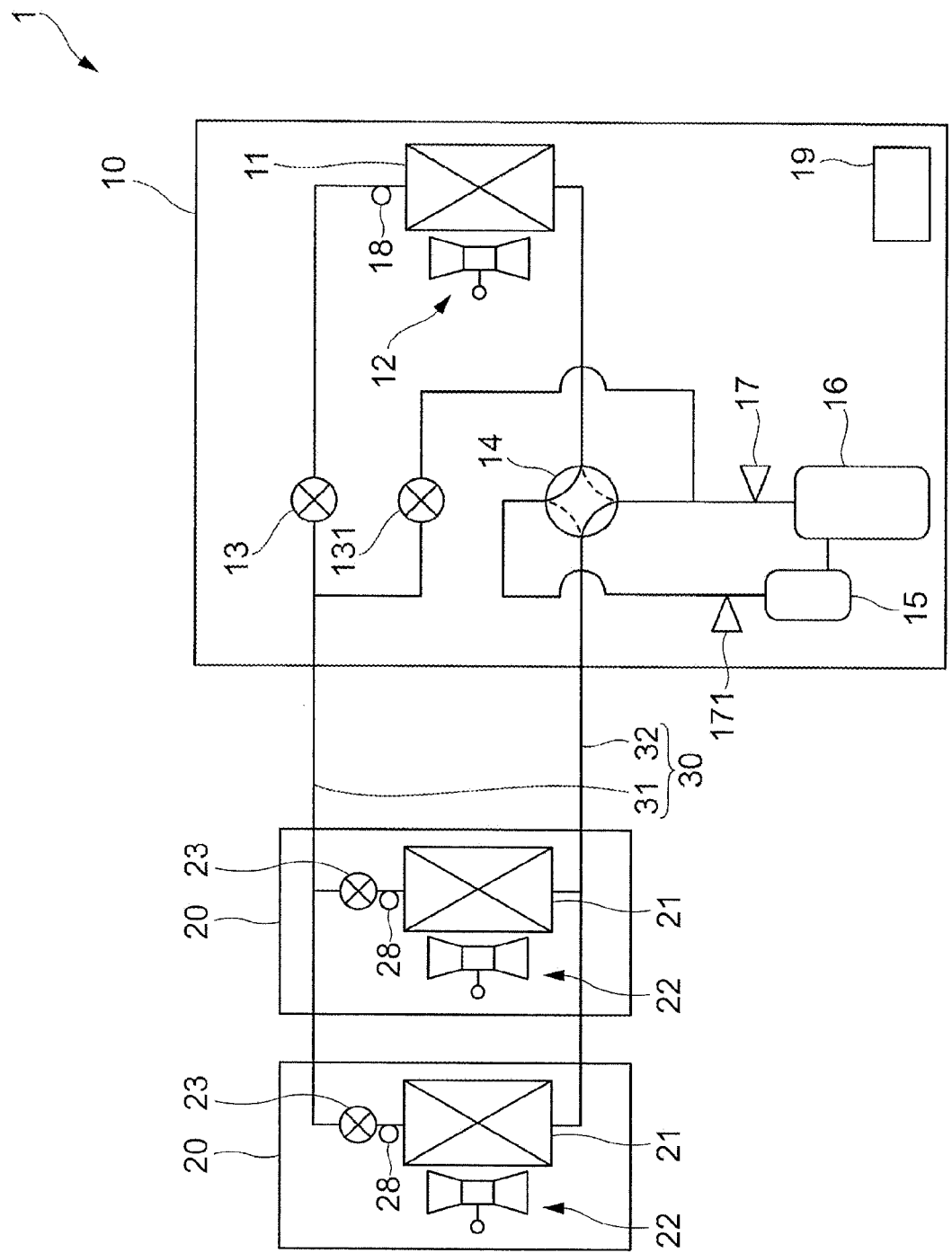
FIG. 3 illustrates a schematic block diagram of an air conditioner according to a second embodiment of the present disclosure.

FIG. 3 illustrates a schematic block diagram of the air conditioner 1 according to the second embodiment.

In comparison to the air conditioner 1 according to the first embodiment above, the air conditioner 1 according to the second embodiment of the present disclosure further includes a bypass pipe configured to bypass the refrigerant from a discharge side of the compressor 16 toward the downstream side of the outdoor heat exchanger 11, an opening-closing valve 131 configured to open or close the bypass pipe, and a pressure sensor 171 configured to sense a suction pressure of the compressor 16.

In the air conditioner 1, when lengths of the refrigerant pipes 30 are longer than a predetermined length (for example, 60 m), in addition to the control method of the first embodiment, the controller 19 controls the opening-closing valve 131 so that a gaseous refrigerant is bypassed toward the downstream side of the outdoor heat exchanger 11 via the bypass pipe when an evaporation pressure of the indoor heat exchangers 21 is higher than a reference evaporation pressure. The evaporation pressure of the indoor heat exchangers 21 may also be detected by the pressure sensor 171.

Consequently, when the heating operation is performed in a state in which the refrigerant pipes 30 between the outdoor unit 10 and the indoor units 20 are longer than a predetermined length and thus large pressure loss may occur, the air conditioner 1 bypasses the high-pressure gaseous refrigerant before passing through the indoor heat exchangers 21 toward the downstream side of the outdoor heat exchanger 11 via the bypass pipe of the indoor heat exchangers 21 and the opening-closing valve 131.

Consequently, because the gaseous refrigerant is mixed with the refrigerant circulating through the liquid refrigerant pipe 31, a decompression amount required for the liquid refrigerant to become a two-phase refrigerant, which is a gas-liquid mixture, may be decreased.

Third Embodiment

Figure 4:
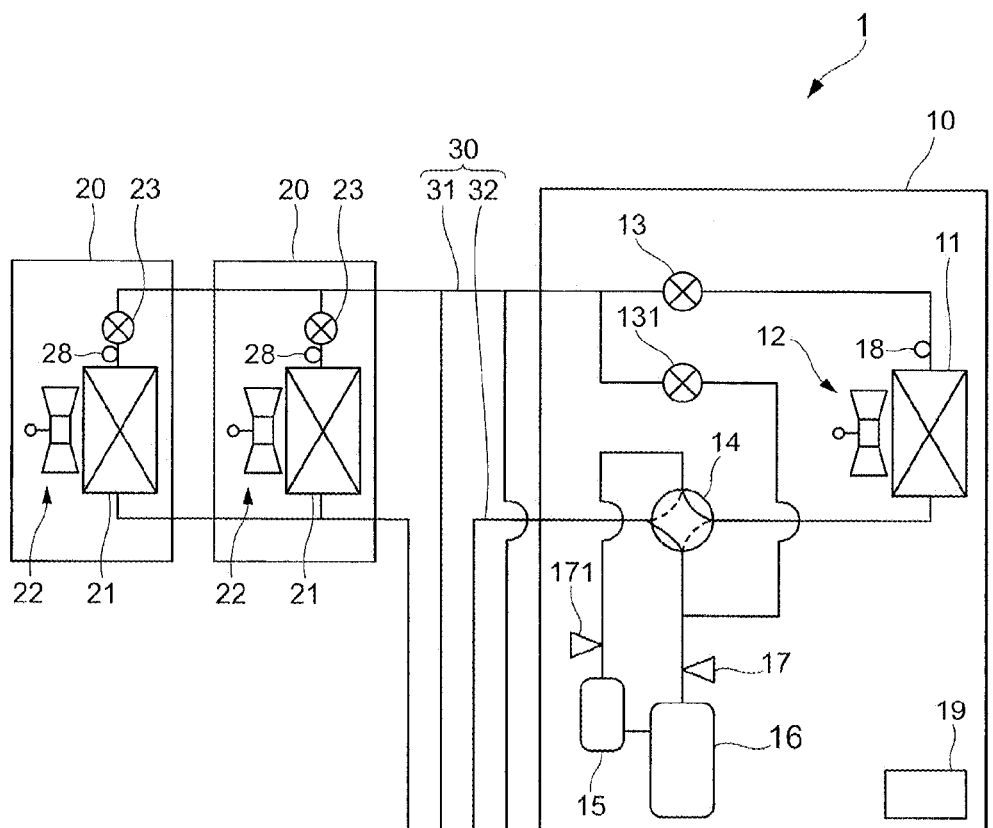
FIG. 4 illustrates a schematic block diagram of an air conditioner according to a third embodiment of the present disclosure.

FIG. 4 illustrates a schematic block diagram of an air conditioner according to a third embodiment of the present disclosure. The third embodiment of the present disclosure is an air conditioner according to a second modified example of the first embodiment.

The air conditioner 1 according to the third embodiment includes a plurality of sets of the outdoor unit 10 and the indoor units 20 of the second embodiment illustrated in FIG. 3. Here, the outdoor unit 10 applied to the first embodiment illustrated in FIG. 1 may also be used as the outdoor unit 10.

Control during the cooling operation of the air conditioner 1 according to the third embodiment may be performed in the same way as in the second embodiment described above.

Control during the heating operation of the air conditioner 1 according to the third embodiment is as follows.

When a plurality of outdoor units 10 are operating, an evaporation pressure of a refrigerant in the outdoor heat exchangers 11 is controlled by the outdoor expansion valves 13 so that a degree of superheat of the outdoor heat exchangers 11 reaches a target degree of superheat to prevent variations between the outdoor units 10.

When an outdoor unit 10 that is not operating is present, to prevent a refrigerant from being stored in the outdoor unit 10 that is not operating, the outdoor expansion valve 13 corresponding to the outdoor unit 10 that is not operating is closed.

Fourth Embodiment

Figure 5:
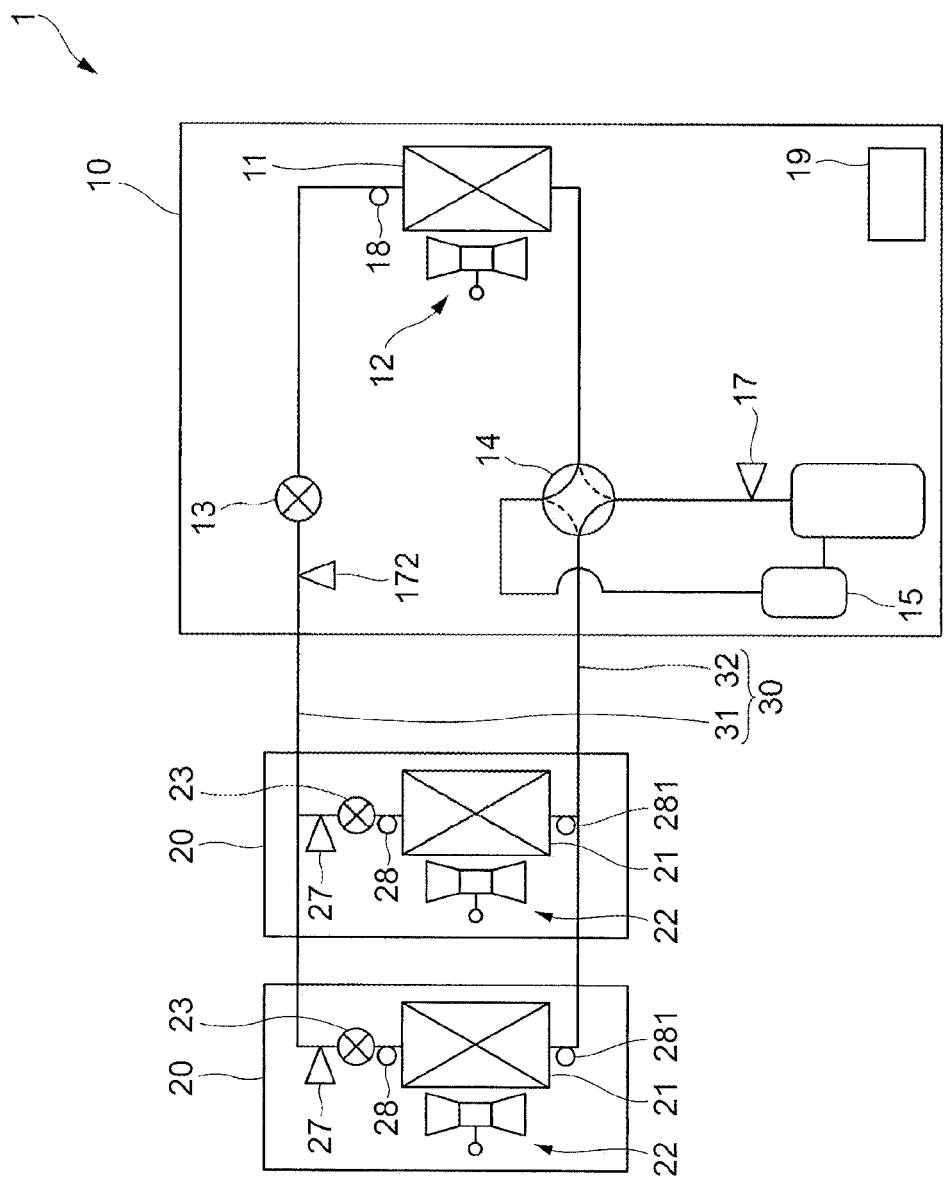
FIG. 5 illustrates a schematic block diagram of an air conditioner according to a fourth embodiment of the present disclosure.

FIG. 5 illustrates a schematic block diagram of an air conditioner 1 according to a fourth embodiment of the present disclosure and illustrates the air conditioner 1 according to a third modified example of the first embodiment.

The air conditioner 1 according to the fourth embodiment of the present disclosure further includes a pressure sensor 172 installed at the liquid refrigerant pipe 31 in the outdoor unit 10, a pressure sensor 27 installed at the liquid refrigerant pipe 31 in each of the indoor units 20, and a temperature sensor 281 installed at the gaseous refrigerant pipe 32 of each of the indoor units 20.

Although the indoor expansion valve 23 and the pressure sensor 27 are installed for each of the indoor units 20 above, a single indoor expansion valve 23 and a single pressure sensor 27 may also be installed for the plurality of indoor units 20.

The air conditioner 1 calculates a density of the refrigerant from a pressure, temperature, and pressure after decompression of the liquid refrigerant pipe 31 and controls the density.

Specifically, the air conditioner 1 performs the following control during the cooling operation.

A physical property value of the refrigerant stored in the liquid refrigerant pipe 31 is detected by the pressure sensors 172 and 27. A density of the refrigerant is estimated from a physical property value of the refrigerant detected by the pressure sensor 17 and the temperature sensors 18 and 28 and a pressure after decompression by the outdoor expansion valve 13 detected by the pressure sensor 172. Then, the density of the refrigerant is determined in consideration of a reduced amount of the refrigerant, and the density of the refrigerant is controlled to be the determined density by decompression by the outdoor expansion valve 13. For example, when a filling amount of the refrigerant is reduced by 30%, the density of the refrigerant is also controlled to be reduced by 30%.

When the air conditioner 1 performs a heating operation, a physical property value of a refrigerant is calculated from a temperature detected by the temperature sensor 28 and a discharge pressure detected by the pressure sensor 17, and a density of the refrigerant is estimated from the physical property value of the refrigerant and a pressure after decompression detected by the pressure sensor 172.

The air conditioners 1 according to the first embodiment to the fourth embodiment may be operated while performance thereof is maintained even when an amount of refrigerant is reduced by 30% by, for example, reducing the density of the refrigerant passing through the liquid refrigerant pipe 31 by 30% to correspond to the reduced amount of the refrigerant.

The air conditioner may be operated with optimum efficiency in accordance with an operation condition when a density of the liquid refrigerant pipe is adjusted in accordance with the operation condition and an amount of refrigerant in the outdoor unit and the indoor units is adjusted to be an optimal amount of refrigerant in accordance with the operation condition.

Outline of Fifth Embodiment

Embodiments of the present disclosure a method also allow for a way to replace a portion of a liquid refrigerant with a gaseous refrigerant to reduce the amount of refrigerant used in an air conditioner.

Generally, when the heating operation is performed after a portion of a liquid refrigerant is replaced with a gaseous refrigerant, an injection pressure of the refrigerant sent to the compressor via the injection circuit is lowered, and there is a problem in that heating performance is deteriorated by this.

To address the above-discussed deficiencies, it is the primary object of a fifth embodiment is to allow an injection pressure to increase and a heating capability to be maintained during the heating operation even when a portion of a liquid refrigerant is replaced with a gaseous refrigerant in the air conditioner including the injection circuit.

Fifth Embodiment

Figure 6:
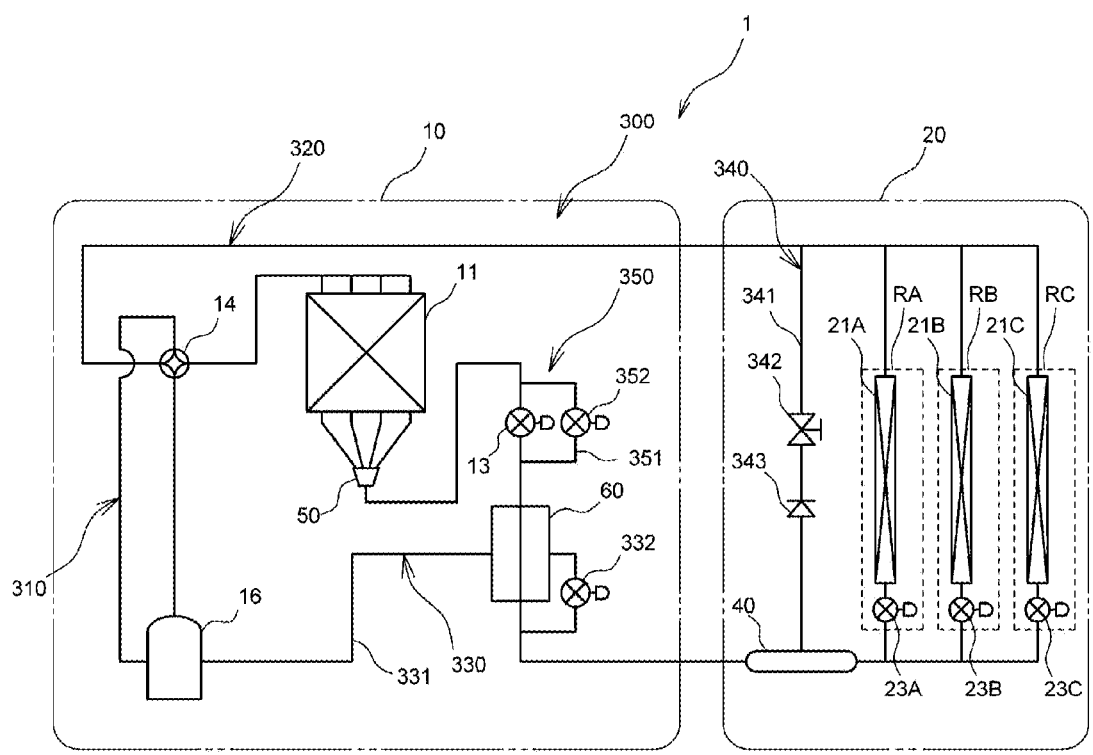
FIG. 6 illustrates a schematic block diagram of an air conditioner according to a fifth embodiment of the present disclosure.

FIG. 6 illustrates a schematic block diagram of an air conditioner according to a fifth embodiment of the present disclosure. As illustrated in FIG. 6, the air conditioner 1 according to the fifth embodiment includes the indoor unit 20, the outdoor unit 10, and components of a heat pump cycle 300 distributed between the indoor unit 20 and the outdoor unit 10.

A refrigerant used in the air conditioner is a two-phase refrigerant in which a gas and a liquid are mixed, and a gaseous refrigerant circulating in the heat pump cycle 300 is set to have an average volume of 30% or higher.

The indoor unit 20 includes a gas-liquid separator 40, first decompression valves 23A, 23B, and 23C connected in parallel to each other, and indoor heat exchangers 21A, 21B, and 21C respectively connected in series to the first decompression valves 23A, 23B, and 23C.

The first decompression valves 23A, 23B, and 23C and the indoor heat exchangers 21A, 21B, and 21C respectively corresponding to the first decompression valves 23A, 23B, and 23C are respectively installed in separate spaces RA, RB, and RC.

The outdoor unit 10 includes the four-way valve 14, the compressor 16, the outdoor heat exchanger 11, a distributor 50, a second decompression valve 13, and an auxiliary heat exchanger 60.

The heat pump cycle 300 includes a main refrigerant circuit 320 in which the gas-liquid separator 40, the first decompression valves 23A, 23B, and 23C, the indoor heat exchangers 21A, 21B, and 21C, the four-way valve 14, the outdoor heat exchanger 11, the distributor 50, and the second decompression valve 13 are connected in that order, and a compression circuit 310 in which the compressor 16 is connected to the four-way valve 14.

The heat pump cycle 300 includes an injection flow path 330 branched from the main refrigerant circuit 320 between the gas-liquid separator 40 and the second decompression valve 13. The injection flow path 330 allows a portion of the gas-liquid two-phase refrigerant passing between the gas-liquid separator 40 and the second decompression valve 13 to be guided to the compressor 16 without being transferred to the outdoor heat exchanger 11.

The injection flow path 330 includes an injection refrigerant pipe 331 having one end connected to a suctioning side of the compressor 16 and the other end connected to the main refrigerant circuit 320 between the gas-liquid separator 40 and the second decompression valve 13, an electric valve 332 installed in the injection refrigerant pipe 331 to serve as a flow rate control valve configured to control a flow rate of a refrigerant passing through the injection refrigerant pipe 331, and the auxiliary heat exchanger 60 installed in the injection refrigerant pipe 331 between the compressor 16 and the electric valve 332 and through which the main refrigerant circuit 320 passes.

The heat pump cycle 300 further includes a first bypass flow path 340 branched from the main refrigerant circuit 320 to guide a portion of the gaseous refrigerant in the gas-liquid separator 40 to between the above-described indoor heat exchangers 21A, 21B, and 21C and the compressor 16.

The first bypass flow path 340 includes a first bypass refrigerant pipe 341 having one end connected to a gas-phase space of the gas-liquid separator 40 and the other end connected to the main refrigerant circuit 320 between the indoor heat exchangers 21A, 21B, and 21C and the compressor 16, an electric valve 342 which is a flow rate control valve installed in the first bypass refrigerant pipe 341, and a check valve 343 installed in the first bypass refrigerant pipe 341 between the electric valve 342 and the gas-liquid separator 40. The check valve 343 prevents a high-pressure refrigerant discharged from the compressor 16 during the heating operation from being introduced into the gas-liquid separator 40.

The heat pump cycle 300 further includes a second bypass flow path 350 configured to allow a third decompression valve 352 to be connected in parallel to the second decompression valve 13 installed in the main refrigerant circuit 320.

The second bypass flow path 350 includes a second bypass refrigerant pipe 351 having one end connected to between the second decompression valve 13 and the distributor 50 and the other end connected to between the second decompression valve 13 and a branch point of the injection flow path 330 of the main refrigerant circuit 320, and the third decompression valve 352 formed as an electronic expansion valve and installed in the second bypass refrigerant pipe 351.

Figure 7:
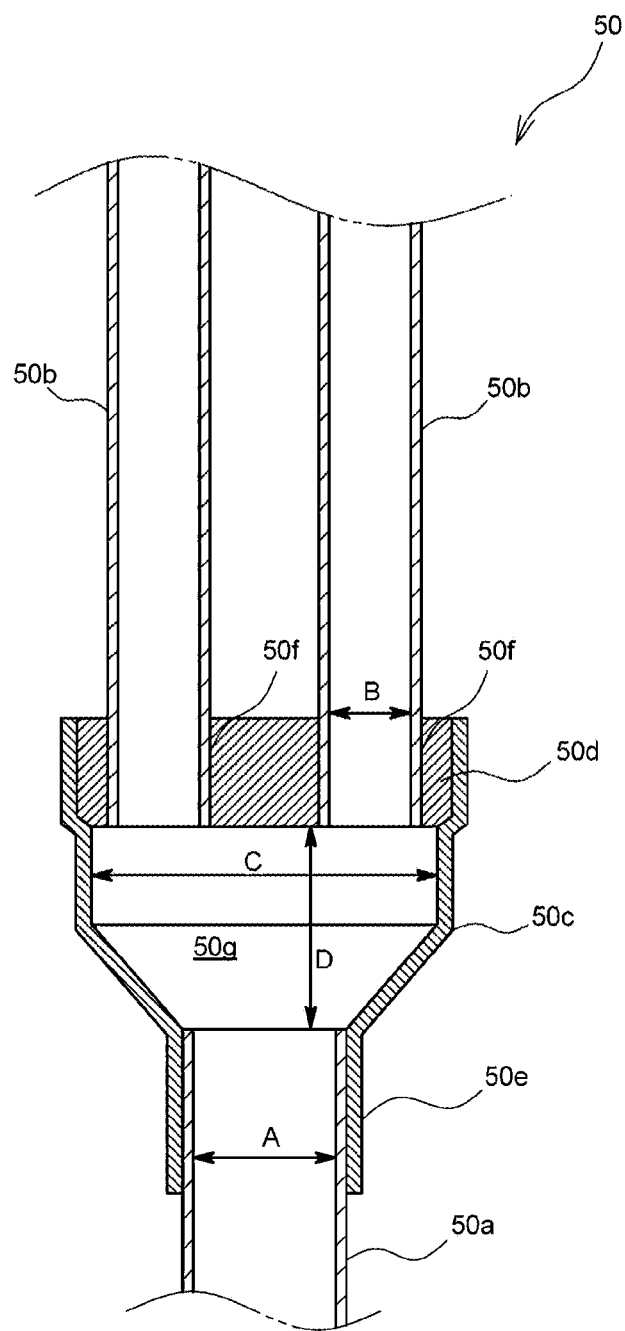
FIG. 7 illustrates a cross-sectional view of a distributor applied to the air conditioner according to the fifth embodiment of the present disclosure.

FIG. 7 illustrates a cross-sectional view of a distributor applied to the air conditioner according to the fifth embodiment of the present disclosure. As illustrated in FIG. 7, the distributor 50 includes a single inlet pipe 50a, a plurality of outlet pipes 50b, and a main body 50c having one end connected to the inlet pipe 50a and the other end connected to the plurality of outlet pipes 50b.

The main body 50c is formed in a cylindrical shape whose diameter gradually widens from an opening at an inlet side toward an opening at an outlet side, and a cover 50d is installed at the opening at the outlet side of the main body 50c.

The main body 50c includes an inlet connection port 50e provided at the inlet side and in which the inlet pipe 50a is installed, and the cover 50d includes a plurality of outlet connection ports 50f in which the plurality of outlet pipes 50b are installed.

Figure 8:
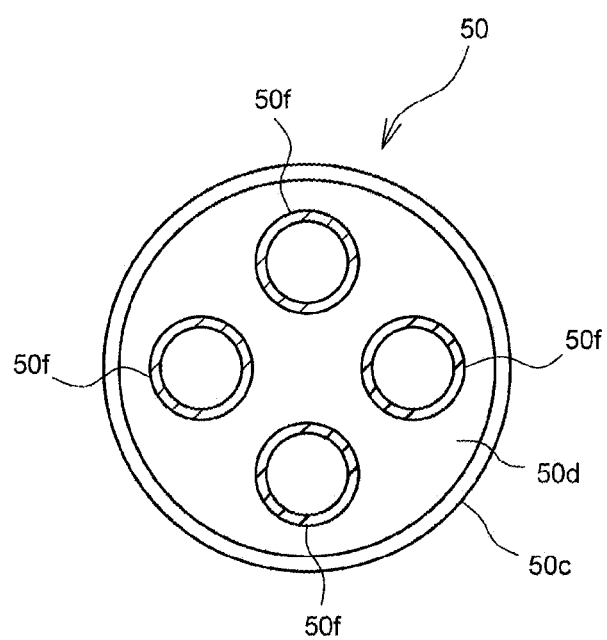
FIG. 8 illustrates a plan view illustrating the distributor applied to the air conditioner according to the fifth embodiment of the present disclosure.

In the present embodiment, four outlet connection ports 50f are formed in the cover 50d, and the outlet connection ports 50f are disposed to be spaced apart from each other in a circumferential direction (see FIG. 8). For example, FIG. 8 illustrates a plan view illustrating the distributor applied to the air conditioner according to the fifth embodiment of the present disclosure.

A body space 50g is formed between a front end of the inlet pipe 50a and front ends of the outlet pipes 50b inside the main body 50c in a state in which the inlet pipe 50a is connected to the inlet connection port 50e and the outlet pipes 50b are connected to the outlet connection ports 50f. The body space 50g has a diameter that gradually narrows from an outlet side toward an inlet side.

The distributor 50 is set such that a ratio of an inner diameter B of each of the outlet pipes 50b with respect to an inner diameter A of the inlet pipe 50a is 0.6 or higher, and a ratio of a maximum inner diameter C of the body space 50g with respect to the inner diameter A of the inlet pipe 50a is 2.25 or lower. A ratio of a length D from the inlet side to the outlet side of the body space 50g with respect to the inner diameter A of the inlet pipe 50a is set to be 1.4 or lower. The distributor 50 may satisfy the above conditions and include four or more outlet pipes 50b.

In a state in which the distributor 50 is disposed such that the inlet pipe 50a extends downward, which is the direction of gravity, and the plurality of outlet pipes 50b extend upward, the inlet pipe 50a is connected to the second decompression valve 13, and the plurality of outlet pipes 50b are connected to heat transfer pipes (not illustrated) of the outdoor heat exchanger 11.

Although not illustrated in the drawings, the air conditioner 1 of the present embodiment is configured to be controlled by a controller. The controller is configured by a so-called computer including a CPU, a memory, an AD/DA converter, an input/output means, and the like. The controller organically controls the components of the air conditioner 1 in accordance with a program stored in the memory, thereby realizing operations of the air conditioner.

In more detail, when a refrigerant discharge pressure of the compressor 16 is ±0.3 MPa or higher, the controller controls the components of the heat pump cycle 300 so that a degree of dryness of the inlet pipe 50a of the distributor 50 is 0.12 or higher. Accordingly, a flow speed of a refrigerant may be increased by enlarging diameters of the outlet pipes 50b, and the distributor 50 with small pressure loss may be used.

Various components of the heat pump cycle 300 are controlled so that a flow speed of a refrigerant passing through each of the outlet pipes 50b of the distributor 50 is equal to or higher than a threshold refrigerant flow speed U (m/s) calculated from Mathematical Relation 1 below. In this way, by controlling the refrigerant flow speed in each of the outlet pipes 50b of the distributor 50 to be equal to or higher than the threshold refrigerant flow speed U, a liquid refrigerant flows upward along each of the outlet pipes 50b against gravity, and a drift in the distributor 50 is prevented.

$$U = \{g \cdot dx \cdot (\rho_{liq} - \rho_g)/\rho_g\}^{0.5} \qquad \text{[Mathematical Relation 1]}$$

In Mathematical Relation 1 above, g indicates gravitational acceleration (m/sec$^2$), dx indicates an inner diameter (m) of the outlet pipe 50b of the distributor 50 in a state in which a degree of dryness at the inlet pipe 50a side of the distributor 50 is 0.12 or higher, $\rho_{liq}$ indicates a liquid density (kg/m$^3$) of a refrigerant, and $\rho_g$ indicates a gas density (kg/m$^3$) of the refrigerant.

Next, an operation during the heating operation will be described.

Figure 9A:
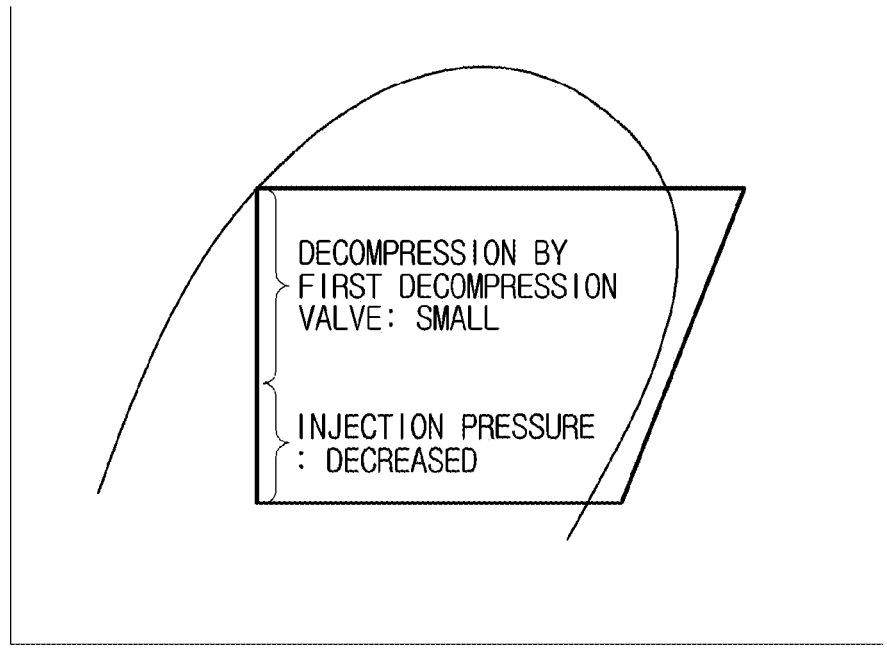
FIG. 9A illustrates a Mollier diagram of a case in which a predetermined condition is satisfied during a heating operation of the air conditioner according to the fifth embodiment of the present disclosure.

First, the controller senses an outside air temperature from a temperature sensor (not illustrated) installed outdoors to measure an outside air temperature. When the sensed outside air temperature is equal to or higher than a predetermined temperature (specifically, when the outside air temperature is equal to or higher than 7° C.), because deterioration of heating performance does not cause a problem, the controller controls the first decompression valves 23A, 23B, and 23C to be widely open and significantly decompresses a refrigerant transferred from the indoor heat exchangers 21A, 21B, and 21C. Also, the controller increases an amount of refrigerant introduced into the distributor 50 by controlling the second decompression valve 13 and the third decompression valve 352 to be simultaneously open (first control). Because an injection pressure of the refrigerant introduced into the compressor 16 via the injection flow path 330 decreases due to the first control, a capability of the compressor 16 to compress the refrigerant is deteriorated, and accordingly, the heating capability is deteriorated. However, pressure loss of the refrigerant passing through the main refrigerant circuit 320 may be reduced. Consequently, a proportion of a gaseous refrigerant with respect to a liquid refrigerant may be increased, and an amount of the liquid refrigerant may be decreased (see FIG. 9A). For example, FIG. 9A illustrates a Mollier diagram of a case in which a predetermined condition is satisfied during a heating operation of the air conditioner according to the fifth embodiment of the present disclosure.

Figure 9B:
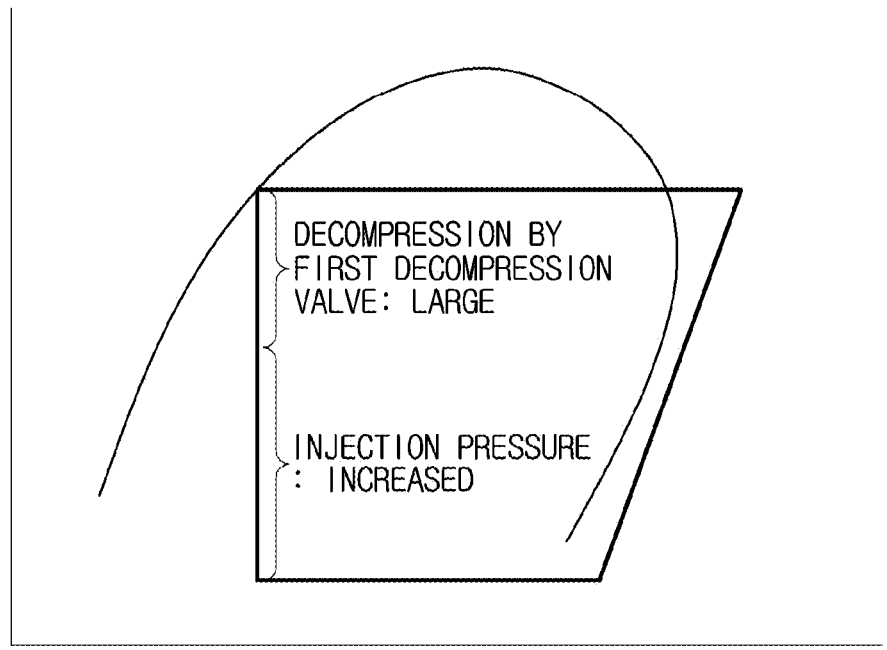
FIG. 9B illustrates a Mollier diagram illustrating a case in which the predetermined condition is not satisfied during the heating operation of the air conditioner according to the fifth embodiment of the present disclosure.

When the outside air temperature is lower than the predetermined temperature (when the outside air temperature is lower than 7° C.), because high heating performance is required to be maintained, the controller controls the first decompression valves 23A, 23B, and 23C to be narrowly open and slightly decompresses a refrigerant discharged from the indoor heat exchangers 21A, 21B, and 21C. Also, the controller decreases an amount of refrigerant introduced into the distributor 50 by controlling the second decompression valve 13 to be open and the third decompression valve 352 to be closed (second control). Although the pressure loss of the refrigerant passing through the main refrigerant circuit 320 increases due to the second control, because the injection pressure of the refrigerant introduced into the compressor 16 via the injection flow path 330 rises, the capability of the compressor 16 to compress the refrigerant is improved, and the heating capability is also improved (see FIG. 9B). For example, FIG. 9B illustrates a Mollier diagram illustrating a case in which the predetermined condition is not satisfied during the heating operation of the air conditioner according to the fifth embodiment of the present disclosure.

In the present embodiment, the distributor 50 has a structure that decreases pressure loss when a two-phase refrigerant, which is a gas-liquid mixture, passes from the inlet pipe 50*a* toward the plurality of outlet pipes 50*b*. Consequently, pressure loss of a refrigerant may be significantly reduced during the heating operation, and a proportion of a gaseous refrigerant with respect to a liquid refrigerant may be significantly reduced. Such a configuration for reducing pressure loss of the distributor 50 also has an effect of improving a cooling capability during the cooling operation.

As described above, because pressure loss due to the distributor 50 decreases, a flow rate of the refrigerant passing through the main refrigerant circuit 320 increases, and the injection pressure of the refrigerant introduced into the compressor 16 via the injection flow path 330 rises. Consequently, performance of the compressor 16 compressing the refrigerant is improved, and the cooling capability is improved.

Sixth Embodiment

A sixth embodiment of the present disclosure is an air conditioner 1 according to a first modified example of the above-described fifth embodiment.

Figure 10:
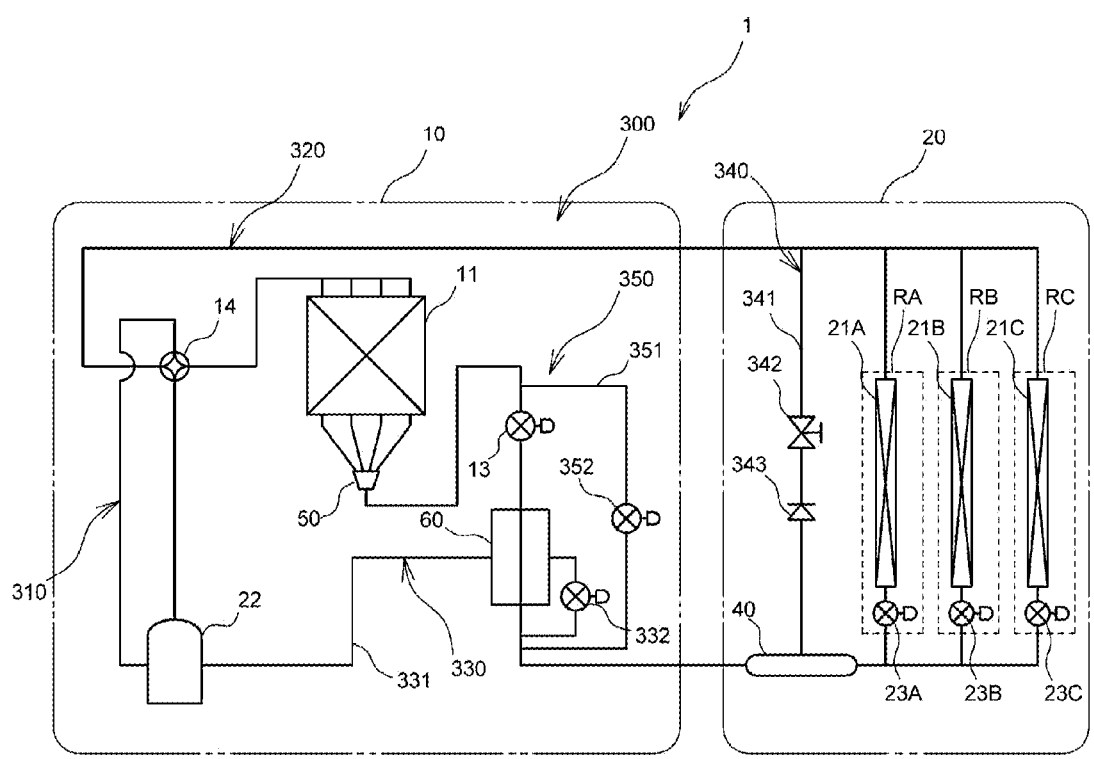
FIG. 10 illustrates a schematic block diagram of an air conditioner according to a sixth embodiment of the present disclosure.

FIG. 10 illustrates a schematic block diagram of an air conditioner according to a sixth embodiment of the present disclosure. As illustrated in FIG. 10, the air conditioner 1 according to the sixth embodiment includes the second bypass flow path 350 having one end connected to between the second decompression valve 13 and the distributor 50 and the other end installed between the gas-liquid separator 40 and the gas-liquid separator 40 (or the first decompression valves 23A, 23B, and 23C) of the main refrigerant circuit 320.

The second bypass flow path 350 includes the second bypass refrigerant pipe 351 connected to an upstream side of a branch point with the injection flow path 330 in the main refrigerant circuit 320 during the heating operation.

During the heating operation, the air conditioner 1 may control the injection pressure of the refrigerant introduced into the compressor 16 via the injection flow path 330 by the third decompression valve 352. Consequently, the air conditioner 1 may be more precisely controlled to correspond to the outside air temperature.

Although the controller controls an operation of the air conditioner on the basis of the outside air temperature during the heating operation of the air conditioner according to the above description, the controller may also control an operation of the air conditioner on the basis of a value that indirectly indicates the outside air temperature (an outside air temperature indication value) such as a pressure difference between a high-pressure side and a low-pressure side of the third decompression valve 352 instead of the outside air temperature.

When the controller controls the operation of the air conditioner 1 on the basis of the pressure difference between the high-pressure side and the low-pressure side of the third decompression valve 352 instead of the outside air temperature, the above-described first control may be performed when the pressure difference is 0.7 MPa or higher, and the above-described second control may be performed when the pressure difference is less than 0.7 MPa.

The controller may also control the air conditioner on the basis of the fact that the outside air temperature indicated by the outside air indication value is equal to or higher than a predetermined temperature as above or control the air conditioner on the basis of the fact that an indoor load of the outdoor unit has a predetermined proportion or higher.

When any one or both of the conditions in which the outside air temperature indicated by the outside air temperature indication value is 7° C. or higher and the indoor load of the outdoor unit is 50% or higher are satisfied, the above-described first control may be performed, and when neither of the two conditions is satisfied, the above-described second control may be performed.

Also, the distributor 50 may have a conical guide member installed in the main body 50*c* so that a refrigerant introduced via the inlet pipe 50*a* is distributed and guided to the outlet pipes 50*b*.

In more detail, the conical guide member is installed at the center of the cover 50*d*. The guide member is installed to be coaxial with the inlet pipe 50*a* while being installed not to cover the outlet connection ports 50*f*. Other than the conical shape, the guide member may also be formed in a pyramidal shape having surfaces corresponding to the outlet pipes 50*b*.

Although the distributor 50 is formed with a structure in which the inlet pipe 50*a* and the plurality of outlet pipes 50*b* are inserted into and connected to the main body 50*c* according to the above description, the inlet pipe 50*a* and the plurality of outlet pipes 50*b* may also be integrally formed with the main body 50*c*.

The air conditioner 1 according to the present embodiment may improve heating performance by increasing the injection pressure during the heating operation and may maintain required cooling/heating performance while replacing a portion of a liquid refrigerant with a gaseous refrigerant.

Outline of Seventh Embodiment

A method of replacing a portion of a liquid refrigerant with a gaseous refrigerant is being tried to meet the above demand. Generally, performance of the air conditioner operating as above is immediately deteriorated when an amount of a refrigerant being used is reduced, it is difficult to meet the above demand while maintaining performance of the air conditioner.

To address the above-discussed deficiencies, it is the primary object of the present embodiment is to allow an amount of a gaseous refrigerant being transferred to the indoor units to be uniform as possible by reducing a difference in amounts of the gaseous refrigerant being transferred to the indoor units in an air conditioner including a plurality of indoor units and in which a portion of a liquid refrigerant is replaced with a gaseous refrigerant.

Seventh Embodiment

Figure 11:
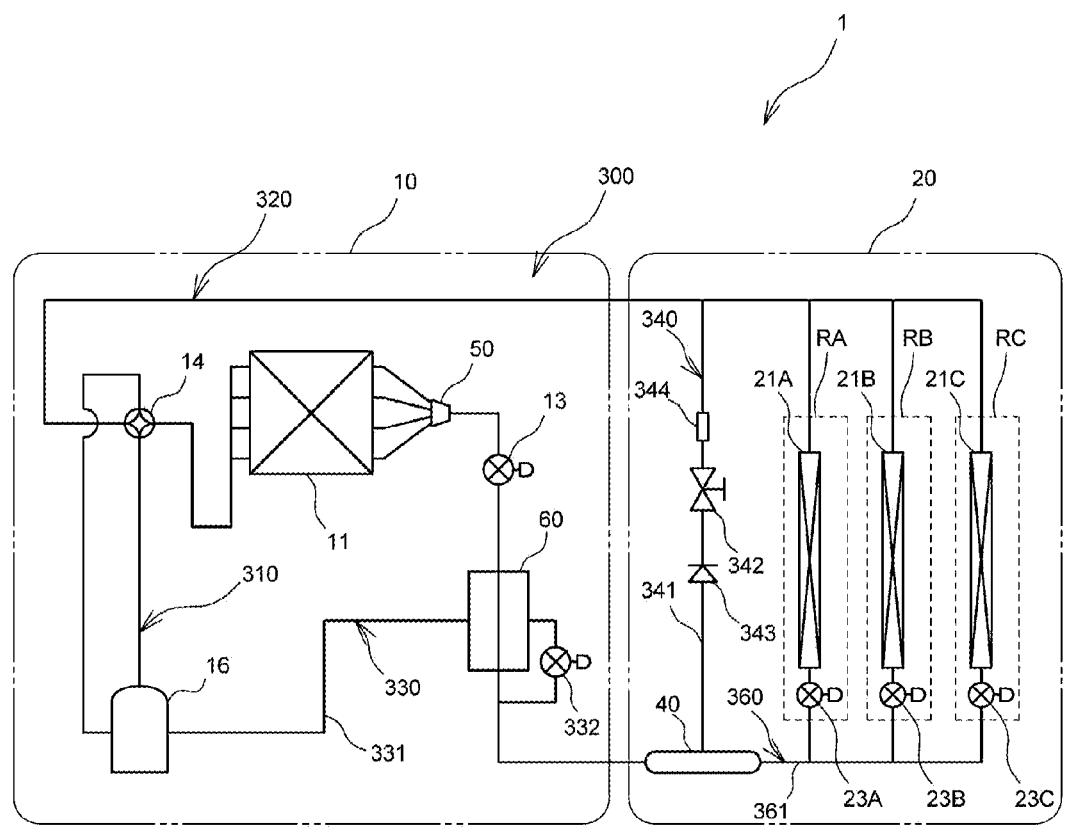
FIG. 11 illustrates a schematic block diagram of an air conditioner according to a seventh embodiment of the present disclosure.

FIG. 11 illustrates a schematic block diagram of an air conditioner according to a seventh embodiment of the present disclosure. As illustrated in FIG. 11, an air conditioner 1 according to the present embodiment includes the indoor unit 20, the outdoor unit 10, and the heat pump cycle 300 included in the indoor unit 20 and the outdoor unit 10 and through which a refrigerant circulates. Here, the refrigerant is a gas-liquid two-phase refrigerant.

The indoor unit 20 includes the gas-liquid separator 40, indoor expansion valves 23A, 23B, and 23C connected in parallel to each other, and a plurality of indoor heat exchangers 21A, 21B, and 21C respectively connected in series to the indoor expansion valves 23A, 23B, and 23C. The indoor expansion valves 23A, 23B, and 23C and the indoor heat exchangers 21A, 21B, and 21C respectively corresponding to the indoor expansion valves 23A, 23B, and 23C are respectively installed in separate spaces RA, RB, and RC.

Consequently, the first indoor heat exchanger 21A and the first indoor expansion valve 23A constitute a first indoor unit installed in the first space RA, the second indoor heat exchanger 21B and the second indoor expansion valve 23B constitute a second indoor unit installed in the second space RB, and the third indoor heat exchanger 21C and the third indoor expansion valve 23C constitute a third indoor unit installed in the third space RC.

The outdoor unit 10 includes the four-way valve 14, the compressor 16, the outdoor heat exchanger 11, a holding tank 40a, the outdoor expansion valve 13, and the auxiliary heat exchanger 60.

The heat pump cycle 300 includes the main refrigerant circuit 320 and the compression circuit 310. The main refrigerant circuit 320 is formed by the gas-liquid separator 40, the indoor expansion valves 23A, 23B, and 23C, the indoor heat exchangers 21A, 21B, and 21C, the four-way valve 14 (four-way valve), the outdoor heat exchanger 11, the holding tank 40a, and the outdoor expansion valve 13 connected in that order, and the compression circuit 310 is formed by the compressor 16 connected to the four-way valve 14.

The gas-liquid separator 40 temporarily holds the two-phase refrigerant transferred from the outdoor expansion valve 13 during the cooling operation to make the two-phase refrigerant be separated into a gaseous refrigerant and a liquid refrigerant and then discharges a portion of the gaseous refrigerant and the entire liquid refrigerant toward the indoor expansion valves 23A, 23B, and 23C.

Figure 12:
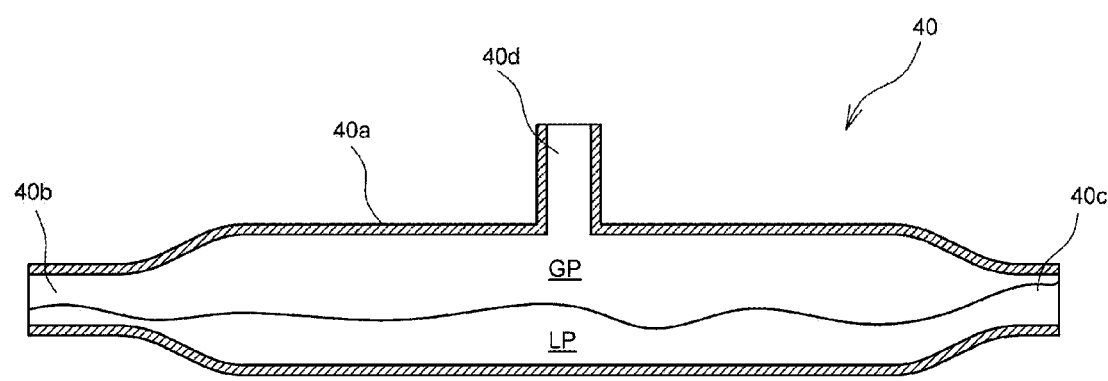
FIG. 12 illustrates a cross-sectional view illustrating a gas-liquid separator applied to the air conditioner according to the seventh embodiment of the present disclosure.

FIG. 12 illustrates a cross-sectional view illustrating a gas-liquid separator applied to the air conditioner according to the seventh embodiment of the present disclosure. As illustrated in FIG. 12, the gas-liquid separator 40 includes the holding tank 40a configured to temporarily hold a refrigerant to make the refrigerant be separated into a gaseous refrigerant and a liquid refrigerant, an inlet 40b connected to an inner space of the holding tank 40a to allow introduction of a refrigerant, a first outlet 40c connected across a gas-phase space GP and a liquid-phase space LP of the holding tank 40a to allow discharge of a portion of the gaseous refrigerant and the entire liquid refrigerant, and a second outlet 40d connected to the gas-phase space GP of the holding tank 40a to discharge a portion of the gaseous refrigerant.

In the present embodiment, the holding tank 40a is formed in a cylindrical shape extending in a horizontal direction, the inlet 40b and the first outlet 40c are provided at side surfaces of the holding tank 40a opposite each other, and the second outlet 40d is provided at an upper surface of the holding tank 40a.

The holding tank 40a has a larger diameter than inner diameters of the inlet 40b and the first outlet 40c. The diameter of the holding tank 40a is set to have a length that allows the gas-liquid two-phase refrigerant introduced into the holding tank 40a from the inlet 40b to be a stratified flow.

The heat pump cycle 300 further includes the injection flow path 330 branched from the main refrigerant circuit 320 and configured to guide a portion of the gas-liquid two-phase refrigerant flowing between the gas-liquid separator 40 and the outdoor expansion valve 13 to the compressor 16.

The injection flow path 330 includes the injection refrigerant pipe 331 having one end connected to a suctioning side of the compressor 16 and the other end connected to the main refrigerant circuit 320 between the gas-liquid separator 40 and the outdoor expansion valve 13, the electric valve 332 which is a flow rate control valve disposed in the injection refrigerant pipe 331, and the auxiliary heat exchanger 60 installed in the injection refrigerant pipe 331 between the compressor 16 and the electric valve 332 and through which the main refrigerant circuit 320 passes.

The heat pump cycle 300 further includes the bypass flow path 340 (first bypass flow path) branched from the main refrigerant circuit 320 to guide a portion of the gaseous refrigerant in the gas-liquid separator 40 to between the indoor heat exchangers 21A, 21B, and 21C and the compressor 16.

The bypass flow path 340 includes the first bypass refrigerant pipe 341 having one end connected to the second outlet 40d of the gas-liquid separator 40 and the other end connected to the main refrigerant circuit 320 between the indoor heat exchangers 21A, 21B, and 21C and the compressor 16, the electric valve 342 which is a flow rate control valve or opening-closing valve formed in the first bypass refrigerant pipe 341, the check valve 343 installed in the first bypass refrigerant pipe 341 between the electric valve 342 and the gas-liquid separator 40, and a temperature sensor 344 configured to measure a temperature of a gaseous refrigerant flowing along the first bypass refrigerant pipe 341 after passing through the electric valve 342. The check valve 343 prevents a high-pressure refrigerant discharged from the compressor 16 during the heating operation from being introduced into the gas-liquid separator 40.

The main refrigerant circuit 320 includes a distribution flow path 360 configured to distribute a portion of a gaseous refrigerant and the entire liquid refrigerant discharged from the gas-liquid separator 40 to the indoor expansion valves 23A, 23B, and 23C.

The distribution flow path 360 includes first branch refrigerant pipes 361 having one end connected to the first outlet 40c of the gas-liquid separator 40 and the other end branched into a number of sections corresponding to the number of the indoor expansion valves 23A, 23B, and 23C. The other ends of the first branch refrigerant pipes 361 are connected to corresponding indoor expansion valves 23A, 23B, and 23C.

The first branch refrigerant pipes 361 of the present embodiment have the other ends extending by being branched into a number of sections corresponding to the number of the indoor expansion valves 23A, 23B, and 23C from one end side connected to the first outlet 40c of the gas-liquid separator 40. A distance from the one end side to the other end side of the first branch refrigerant pipes 361 is preferably within 1 m.

The air conditioner 1 of the present embodiment is controlled by a controller (not illustrated). The controller is configured by a so-called computer including a CPU, a memory, an AD/DA converter, an input/output means, and the like. The controller organically controls the components of the air conditioner 1 in accordance with a program stored in the memory, thereby realizing operations of the air conditioner.

Next, an operation during the cooling operation of the air conditioner 1 will be described.

First, the controller decompresses the gas-liquid two-phase refrigerant discharged from the outdoor heat exchanger 11 so that a degree of dryness due to the outdoor expansion valve 13 is 0.03 or higher. Here, the controller controls the components so that an apparent flow speed of a gaseous refrigerant passing through the gas-liquid separator 40 is 0.2 m/s or lower and an apparent flow speed of a liquid refrigerant is 10 m/s or lower.

Due to such control, the gas-liquid two-phase refrigerant introduced into the gas-liquid separator 40 is separated into a gaseous refrigerant and a liquid refrigerant. Because the first outlet 40c is almost submerged into the liquid refrigerant, in this state, the entire liquid refrigerant and only a portion of the gaseous refrigerant are discharged via the first outlet 40c. Consequently, the degree of dryness of the refrigerant discharged via the first outlet 40c may be less than 0.03.

Also, the controller senses a temperature of the gaseous refrigerant introduced from the gas-liquid separator 40 into the first bypass refrigerant pipe 341 using the temperature sensor 344 and controls a flow rate of the gaseous refrigerant bypassing the indoor heat exchangers 21A, 21B, and 21C from the gas-liquid separator 40 via the first bypass refrigerant pipe 341 with the electric valve 332 to prevent introduction of the liquid refrigerant into the first bypass refrigerant pipe 341.

By the above configuration, a portion of the gaseous refrigerant and the entire liquid refrigerant may be distributed to each of the indoor expansion valves 23A, 23B, and 23C.

Eighth Embodiment

An eighth embodiment of the present disclosure is an air conditioner 1 according to a first modified example of the above-described seventh embodiment and is a modified example of the distribution flow path 360.

Figure 13:
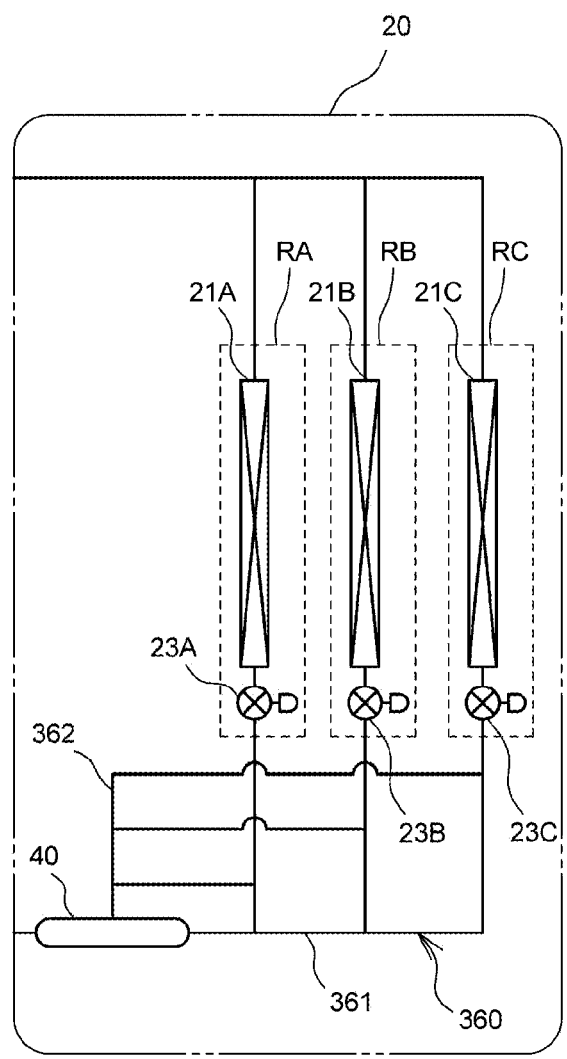
FIG. 13 illustrates a schematic block diagram of an indoor unit applied to the air conditioner according to the seventh embodiment of the present disclosure.

FIG. 13 illustrates a schematic block diagram of an indoor unit applied to the air conditioner according to the seventh embodiment of the present disclosure. As illustrated in FIG. 13, the air conditioner 1 according to the eighth embodiment does not include the bypass refrigerant pipe 341, and the distribution flow path 360 includes the plurality of first branch refrigerant pipes 361 having one end connected to the first outlet 40c of the gas-liquid separator 40 and the other end branched into a number of sections corresponding to the number of the indoor expansion valves 23A, 23B, and 23C, and second branch refrigerant pipes 362 having one end connected to the second outlet 40d of the gas-liquid separator 40 and the other end branched into a number of sections corresponding to the number of the indoor expansion valves 23A, 23B, and 23C.

The other ends of the first branch refrigerant pipes 361 and the other ends of the second branch refrigerant pipes 362 corresponding to each other meet and are connected to corresponding indoor expansion valves 23A, 23B, and 23C. By the above configuration, the entire gaseous refrigerant and the entire liquid refrigerant in the gas-liquid separator 40 are distributed to the indoor expansion valves 23A, 23B, and 23C.

Ninth Embodiment

A ninth embodiment of the present disclosure is an air conditioner 1 according to a second modified example of the above-described seventh embodiment and is a modified example of the gas-liquid separator 40 and the distribution flow path 360.

Figure 14:
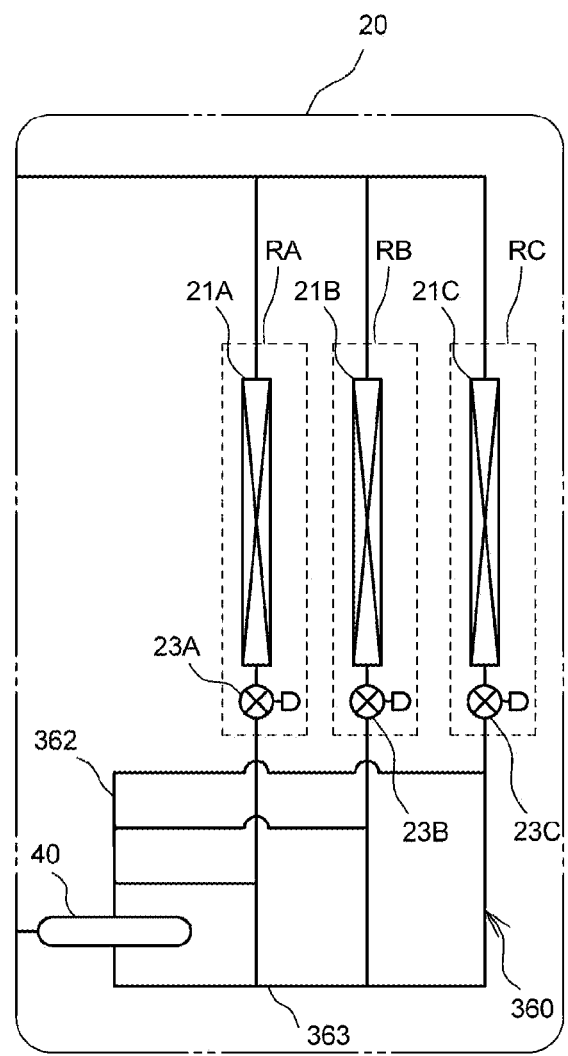
FIG. 14 illustrates a schematic block diagram of an indoor unit applied to an air conditioner according to an eighth embodiment of the present disclosure.

FIG. 14 illustrates a schematic block diagram of an indoor unit applied to an air conditioner according to an eighth embodiment of the present disclosure. As illustrated in FIG. 14, the air conditioner 1 does not include the bypass refrigerant pipe 341.

Figure 15:
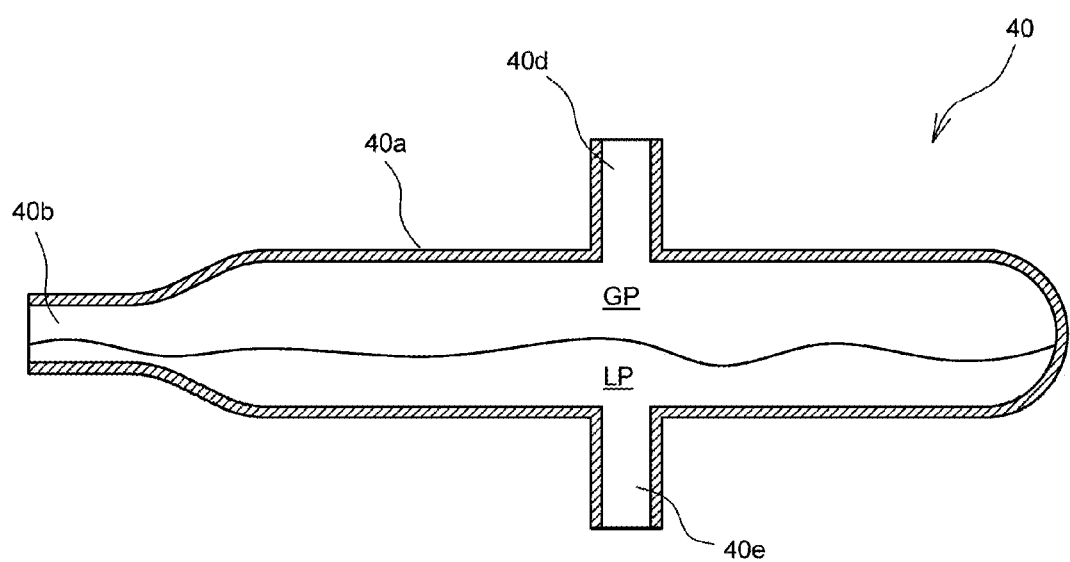
FIG. 15 illustrates a cross-sectional view of a gas-liquid separator applied to an air conditioner according to a ninth embodiment of the present disclosure.

FIG. 15 illustrates a cross-sectional view of a gas-liquid separator applied to an air conditioner according to a ninth embodiment of the present disclosure. As illustrated in FIG. 15, the gas-liquid separator 40 included in the air conditioner 1 includes the holding tank 40a configured to temporarily hold a refrigerant to make the refrigerant be separated into a gaseous refrigerant and a liquid refrigerant, the inlet 40b connected to the inner space of the holding tank 40a to allow introduction of a refrigerant, the second outlet 40d connected to the gas-phase space GP of the holding tank 40a to discharge the gaseous refrigerant, and a third outlet 40e connected to the liquid-phase space LP of the holding tank 40a and through which the liquid refrigerant is discharged.

As illustrated in FIG. 14, the distribution flow path 360 includes the plurality of second branch refrigerant pipes 362 having one end connected to the second outlet 40d of the gas-liquid separator 40 and the other end branched into a number of sections corresponding to the number of the indoor expansion valves 23A, 23B, and 23C, and third branch refrigerant pipes 363 having one end connected to the third outlet 40e of the gas-liquid separator 40 and the other end branched into a number of sections corresponding to the number of the indoor expansion valves 23A, 23B, and 23C.

The other ends of the second branch refrigerant pipes 362 and the other ends of the third branch refrigerant pipes 363 corresponding to each other meet and are connected to corresponding indoor expansion valves 23A, 23B, and 23C. By the above configuration, the entire gaseous refrigerant and the entire liquid refrigerant in the gas-liquid separator 40 are distributed to the indoor expansion valves 23A, 23B, and 23C.

Tenth Embodiment

A tenth embodiment of the present disclosure is an air conditioner 1 according to a third modified example of the above-described seventh embodiment and is a modified example of the gas-liquid separator 40 and the distribution flow path 360.

Figure 16:
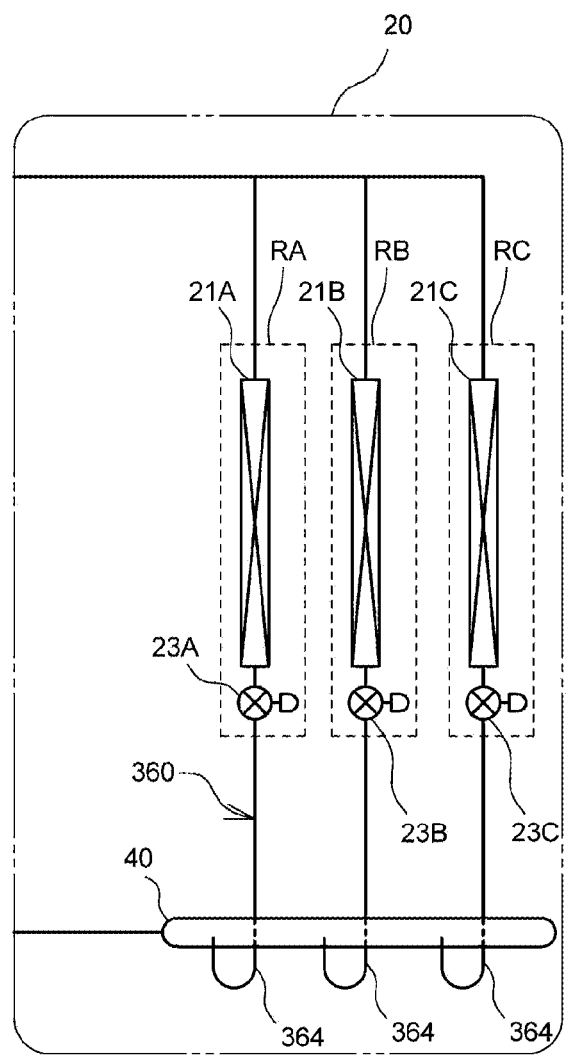
FIG. 16 illustrates a schematic block diagram of an indoor unit applied to an air conditioner according to a tenth embodiment of the present disclosure.

FIG. 16 illustrates a schematic block diagram of an indoor unit applied to an air conditioner according to a tenth embodiment of the present disclosure. As illustrated in FIG. 16, the air conditioner 1 according to the present embodiment does not include the bypass refrigerant pipe 341.

FIG. 17A illustrates cross-sectional views of a gas-liquid separator applied to the air conditioner according to the tenth embodiment of the present disclosure. As illustrated in FIG. 17A, the gas-liquid separator 40 of the air conditioner 1 includes the holding tank 40a configured to temporarily hold a refrigerant to make the refrigerant be separated into a gaseous refrigerant and a liquid refrigerant, the inlet 40b connected to the inner space of the holding tank 40a to allow introduction of a refrigerant, and insertion holes 40f corresponding to the number of the indoor expansion valves 23A, 23B, and 23C and connected to the liquid-phase space LP of the holding tank 40a.

As illustrated in FIG. 16, the distribution flow path 360 includes fourth branch refrigerant pipes 364 corresponding to the number of the indoor expansion valves 23A, 23B, and 23C. One end of each of the fourth branch refrigerant pipes 364 is installed in a corresponding insertion hole 40f of the holding tank 40a and installed to reach the gas-phase space GP by passing through the liquid-phase space LP, and the other end of each of the fourth branch refrigerant pipes 364 is connected to a corresponding indoor expansion valve of the indoor expansion valves 23A, 23B, and 23C.

Figure 17B:
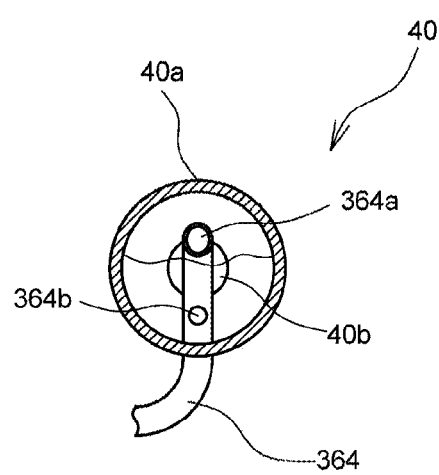

FIG. 17B illustrates cross-sectional views of a gas-liquid separator applied to the air conditioner according to the tenth embodiment of the present disclosure. As illustrated in FIG. 17B, at one end side of each of the fourth branch refrigerant pipes 364, a first intake 364a is formed at a position corresponding to the gas-phase space GP, and a second intake 364b is formed at a position corresponding to the liquid-phase space LP. The first intake 364a and the second intake 364b are open in an opposite direction of the inlet 40b of the gas-liquid separator 40, that is, a direction in which a refrigerant flows in the gas-liquid separator 40.

Open areas of the first intake 364a and the second intake 364b are formed to correspond to a ratio between a gaseous refrigerant and a liquid refrigerant included in a gas-liquid two-phase refrigerant. That is, a proportion of the open area of the first intake 364a matches the proportion of the gaseous refrigerant included in the gas-liquid two-phase refrigerant, and a proportion of the open area of the second intake 364b matches the proportion of the liquid refrigerant included in the gas-liquid two-phase refrigerant.

By the above configuration, the entire gaseous refrigerant and the entire liquid refrigerant in the gas-liquid separator 40 may be distributed to each of the indoor expansion valves 23A, 23B, and 23C.

Although the air conditioners 1 according to the eighth to tenth embodiments do not include the bypass flow path 340 according to the above description, embodiments are not limited thereto.

That is, the air conditioner 1 may include the bypass flow path 340 and allow a portion of the gaseous refrigerant in the gas-liquid separator 40 to be transferred toward the compressor 16 of the indoor heat exchangers 21A, 21B, and 21C. In this case, the remaining portion of the gaseous refrigerant and the entire liquid refrigerant in the gas-liquid separator 40 are distributed to each of the indoor expansion valves 23A, 23B, and 23C.

In the air conditioner according to the above-described seventh embodiment, because there is not much difference in an amount of a gaseous refrigerant introduced into each of the indoor units even when a portion of a liquid refrigerant is replaced with a gaseous refrigerant, the gaseous refrigerant is uniformly transferred to each of the indoor units. Consequently, air conditioning performance of the indoor units may be constantly maintained.

The air conditioner according to an aspect of the present disclosure can constantly maintain performance while reducing an amount of refrigerant being used.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An air conditioner comprising:
a compressor;
an outdoor heat exchanger;
a refrigerant circuit having a plurality of expansion valves connected in parallel to each other and a plurality of indoor heat exchangers respectively connected in series to the plurality of expansion valves;
a gas-liquid separator installed between the plurality of expansion valves and the outdoor heat exchanger; and
a distribution flow path configured to distribute at least a portion of a gaseous refrigerant and all of a liquid refrigerant in the gas-liquid separator to the plurality of expansion valves.

2. The air conditioner of claim 1, further comprising a bypass flow path configured to bypass a portion of the gaseous refrigerant in the gas-liquid separator between the compressor and the plurality of indoor heat exchangers.

3. The air conditioner of claim 1, wherein:
the distribution flow path includes a plurality of first branch refrigerant pipes having one end connected to pass through a gas-phase space and a liquid-phase space of the gas-liquid separator and another end branched into a number of sections corresponding to the plurality of expansion valves; and
the other end of each of the plurality of first branch refrigerant pipes is connected to the plurality of expansion valves.

4. The air conditioner of claim 1, wherein:
the distribution flow path includes:
a plurality of first branch refrigerant pipes having one end connected to cross a gas-phase space and a liquid-phase space of the gas-liquid separator and another end branched into a number of sections corresponding to the plurality of expansion valves, and
a plurality of second branch refrigerant pipes having one end connected to the gas-phase space of the gas-liquid separator and another end branched into a number of sections corresponding to the plurality of expansion valves; and
the other ends of the first branch refrigerant pipes and the second branch refrigerant pipes corresponding to each other meet and are connected to a corresponding expansion valve of the plurality of expansion valves.

5. The air conditioner of claim 1, wherein:
the distribution flow path includes:
a plurality of second branch refrigerant pipes having one end connected to a gas-phase space of the gas-liquid separator and another end branched into a number of sections corresponding to the plurality of expansion valves, and
a plurality of third branch refrigerant pipes having one end connected to a liquid-phase space in the gas-liquid separator and another end branched into a number of sections corresponding to the plurality of expansion valves; and
the other ends of the second branch refrigerant pipes and the third branch refrigerant pipes corresponding to each other meet and are connected to a corresponding expansion valve of the plurality of expansion valves.

6. The air conditioner of claim 1, wherein:
the distribution flow path includes a plurality of fourth branch refrigerant pipes, wherein each of the plurality of fourth branch refrigerant pipes corresponding to one of the plurality of expansion valves; and
each of the fourth branch refrigerant pipes has one end separately connected to a gas-phase space of the gas-liquid separator and another end connected to a corresponding expansion valve of the plurality of expansion valves.

7. The air conditioner of claim 6, wherein:
the one end of each of the fourth branch refrigerant pipes is installed to pass through a liquid-phase space and reach the gas-phase space in the gas-liquid separator; and
each of the fourth branch refrigerant pipes includes a first intake provided at the one end, and a second intake, wherein the first intake draws in the gaseous refrigerant in the gas-liquid separator, and wherein the second intake draws in the liquid refrigerant in the gas-liquid separator.

8. The air conditioner of claim 7, wherein at least one of the first intake and the second intake is open in a direction that refrigerant passing through the gas-liquid separator flows.

9. The air conditioner of claim 7, wherein a ratio between an open area of the first intake and an open area of the second intake is equal to a ratio between the gaseous refrigerant and the liquid refrigerant.

\* \* \* \* \*